(12) United States Patent
White et al.

(10) Patent No.: US 7,248,892 B2
(45) Date of Patent: Jul. 24, 2007

(54) ELECTRICAL DEVICES

(75) Inventors: Andrew David White, Wokingham (GB); Marc Adrian Borrett, Wokingham (GB); David Bernard Mapleston, Highworth (GB)

(73) Assignee: Innovision Research & Technology PLC (GB)

( * ) Notice: Subject to any disclaimer, the term of this patent is extended or adjusted under 35 U.S.C. 154(b) by 0 days.

(21) Appl. No.: 10/477,733

(22) PCT Filed: May 14, 2002

(86) PCT No.: PCT/GB02/02257

§ 371 (c)(1),
(2), (4) Date: May 27, 2004

(87) PCT Pub. No.: WO02/093881

PCT Pub. Date: Nov. 21, 2002

(65) Prior Publication Data

US 2005/0026643 A1    Feb. 3, 2005

(30) Foreign Application Priority Data

| May 14, 2001 | (GB) | ................................ 0111722.5 |
| Dec. 10, 2001 | (GB) | ................................ 0129490.9 |
| Dec. 10, 2001 | (GB) | ................................ 0129491.7 |
| Apr. 10, 2002 | (GB) | ................................ 0208275.8 |

(51) Int. Cl.
*H04M 1/00* (2006.01)
*H04B 1/38* (2006.01)

(52) U.S. Cl. .................... 455/550.1; 455/558; 455/557

(58) Field of Classification Search ............ 455/550.1, 455/575.1, 556.1, 558, 550, 406; 379/446, 379/58; 320/107; 361/814; 235/380, 451, 235/492, 383, 494; 375/239, 130

See application file for complete search history.

(56) References Cited

U.S. PATENT DOCUMENTS 4,333,072 A    6/1982    Beigel (Continued)

FOREIGN PATENT DOCUMENTS

AU    736350    4/1999

(Continued)

OTHER PUBLICATIONS

European Search Report, Application No. EP 04 076968, Nov. 3, 2004.

(Continued)

*Primary Examiner*—Joseph Feild
*Assistant Examiner*—Kiet Doan
(74) *Attorney, Agent, or Firm*—Finnegan, Henderson, Farabow, Garrett & Dunner, LLP

(57) ABSTRACT

An electrical device such as a portable communications device, domestic or personal care appliance has a main body adapted to couple to an accessory which may be in the form of a tool attachable to the main body or a housing portion. The accessory carries a passive data storage device having a memory (59) storing control data for controlling an operation or affecting a function of the device. The passive data storage device is arranged to derive a power supply from the main body when a first coupler carried by the main body is placed in proximity to a second coupler carried by the accessory (3). Where the electrical device is a portable communications device, then the accessory may be, for example, a fascia. The coupling between the first and second couplers may be inductive or capacitive.

16 Claims, 17 Drawing Sheets

U.S. PATENT DOCUMENTS

| | | |
|---|---|---|
| 4,588,339 A | 5/1986 | Bilz |
| 4,809,426 A | 3/1989 | Takeuchi et al. |
| 5,077,832 A | 12/1991 | Szczutkowski et al. |
| 5,131,038 A | 7/1992 | Puhl et al. |
| 5,257,199 A | 10/1993 | Tsujino et al. |
| 5,455,466 A | 10/1995 | Parks et al. |
| 5,465,401 A | 11/1995 | Thompson |
| 5,493,805 A | 2/1996 | Penuela et al. |
| 5,551,430 A | 9/1996 | Blakeley et al. |
| 5,553,314 A | 9/1996 | Grube et al. |
| 5,714,741 A * | 2/1998 | Pieterse et al. ............ 235/380 |
| 5,787,361 A * | 7/1998 | Chen ..................... 455/575.1 |
| 5,796,351 A | 8/1998 | Yabuki |
| 5,802,467 A * | 9/1998 | Salazar et al. ............. 455/420 |
| 5,818,701 A * | 10/1998 | Shindo ...................... 361/814 |
| 5,848,152 A | 12/1998 | Slipy et al. |
| 5,882,338 A | 3/1999 | Gray |
| 5,883,576 A | 3/1999 | De la Huerga |
| 5,911,121 A | 6/1999 | Andrews |
| 5,918,189 A | 6/1999 | Kivela |
| 5,956,399 A * | 9/1999 | Whitley et al. ............ 379/446 |
| 5,979,758 A * | 11/1999 | Swartz et al. .............. 235/383 |
| 5,980,501 A | 11/1999 | Gray |
| 6,040,786 A * | 3/2000 | Fujioka ..................... 340/928 |
| 6,061,617 A | 5/2000 | Berger et al. |
| 6,074,386 A | 6/2000 | Goble et al. |
| 6,163,616 A | 12/2000 | Feldman |
| 6,173,899 B1 * | 1/2001 | Rozin ........................ 235/492 |
| 6,181,885 B1 | 1/2001 | Best et al. |
| 6,202,927 B1 * | 3/2001 | Bashan et al. ............. 235/451 |
| 6,222,880 B1 * | 4/2001 | Eastmond et al. ......... 375/239 |
| 6,283,367 B1 * | 9/2001 | Matthew et al. ........... 235/380 |
| 6,304,248 B1 | 10/2001 | Shiobara et al. |
| 6,374,123 B1 * | 4/2002 | Kim ....................... 455/556.1 |
| 6,375,082 B1 * | 4/2002 | Kobayashi et al. ........ 235/492 |
| 6,400,965 B1 * | 6/2002 | Phillips et al. ............. 455/558 |
| 6,456,039 B1 * | 9/2002 | Lauper et al. .............. 320/107 |
| 6,484,022 B1 * | 11/2002 | Findikli et al. ............. 455/411 |
| 6,486,780 B1 | 11/2002 | Garber et al. |
| 6,526,158 B1 | 2/2003 | Goldberg |
| 6,529,880 B1 | 3/2003 | McKeen et al. |
| 6,547,040 B2 | 4/2003 | Goodwin, III |
| 6,570,487 B1 | 5/2003 | Steeves |
| 6,577,861 B2 * | 6/2003 | Ogasawara ................. 455/419 |
| 6,615,057 B1 * | 9/2003 | Pettersson .................. 455/558 |
| 6,690,402 B1 | 2/2004 | Waller |
| 6,697,415 B1 * | 2/2004 | Mahany ..................... 375/130 |
| 6,771,981 B1 * | 8/2004 | Zalewski et al. ........... 455/557 |
| 6,786,407 B1 * | 9/2004 | Takasugi ..................... 235/451 |
| 6,859,650 B1 * | 2/2005 | Ritter ........................ 455/406 |
| 6,882,863 B2 * | 4/2005 | Hansson .................. 455/556.1 |
| 6,909,906 B1 * | 6/2005 | Miyashita ................ 455/550.1 |
| 2001/0020148 A1 | 9/2001 | Sasse et al. |
| 2001/0034565 A1 | 10/2001 | Leatherman |
| 2002/0005774 A1 | 1/2002 | Rudolph et al. |
| 2002/0010629 A1 | 1/2002 | Diamond |
| 2002/0018733 A1 | 2/2002 | Kapplein et al. |
| 2002/0030103 A1 | 3/2002 | Wycherley et al. |
| 2002/0032435 A1 | 3/2002 | Levin |
| 2002/0037738 A1 | 3/2002 | Wycherley et al. |
| 2002/0041175 A1 | 4/2002 | Lauper et al. |
| 2002/0065680 A1 | 5/2002 | Kojima et al. |
| 2002/0072980 A1 | 6/2002 | Dutta |
| 2002/0082042 A1 * | 6/2002 | Mark et al. ................. 455/550 |
| 2002/0147029 A1 * | 10/2002 | Wu ............................. 455/558 |
| 2002/0161460 A1 | 10/2002 | Noguchi |
| 2002/0165758 A1 | 11/2002 | Hind et al. |
| 2002/0170961 A1 | 11/2002 | Dickson et al. |
| 2002/0178369 A1 | 11/2002 | Black |
| 2003/0060682 A1 | 3/2003 | Handa et al. |
| 2004/0029569 A1 | 2/2004 | Khan et al. |
| 2004/0051368 A1 | 3/2004 | Caputo |
| 2004/0159700 A1 | 8/2004 | Khan et al. |
| 2004/0202061 A1 | 10/2004 | Reasoner |

FOREIGN PATENT DOCUMENTS

| | | |
|---|---|---|
| AU | 739465 | 4/1999 |
| CA | 2 294 721 A1 | 12/1988 |
| DE | 19940374 | 3/2001 |
| DE | 19944998 | 4/2002 |
| EP | 0155662 | 9/1985 |
| EP | 0304574 | 3/1989 |
| EP | 0 400 764 A2 | 12/1990 |
| EP | 0 492 569 A2 | 7/1992 |
| EP | 0552873 | 7/1993 |
| EP | 0565976 A1 | 10/1993 |
| EP | 0601999 | 6/1994 |
| EP | 0689151 | 12/1995 |
| EP | 0 820 178 A2 | 1/1998 |
| EP | 0820178 | 1/1998 |
| EP | 0833455 | 4/1998 |
| EP | 0900483 | 3/1999 |
| EP | 0929024 | 7/1999 |
| EP | 0986035 | 3/2000 |
| EP | 1091540 | 4/2001 |
| EP | 1155654 | 11/2001 |
| EP | 1197905 | 4/2002 |
| EP | 1199684 | 4/2002 |
| EP | 1 080 539 | 5/2002 |
| FR | 2792439 | 10/2000 |
| GB | 2060228 | 4/1981 |
| GB | 2 327 565 A | 1/1999 |
| GB | 2208025 A | 2/1999 |
| GB | 2336510 | 10/1999 |
| GB | 2 344 025 A | 5/2000 |
| GB | 2344025 | 5/2000 |
| GB | 2344257 | 5/2000 |
| GB | 2351821 | 1/2001 |
| GB | 2355126 | 4/2001 |
| GB | 2362071 | 11/2001 |
| GB | 2 385 463 A | 8/2003 |
| WO | 93/17530 | 9/1993 |
| WO | 97/39553 | 10/1997 |
| WO | 97/44912 | 11/1997 |
| WO | 98/24527 | 6/1998 |
| WO | WO 98/40867 | 9/1998 |
| WO | 98/58509 | 12/1998 |
| WO | 98/58510 | 12/1998 |
| WO | WO 99/05658 | 2/1999 |
| WO | WO 99/13441 | 3/1999 |
| WO | WO 99/13444 | 3/1999 |
| WO | 99/46669 | 9/1999 |
| WO | WO 99/60713 | 11/1999 |
| WO | WO 00/06904 | 2/2000 |
| WO | WO 00/52655 | 9/2000 |
| WO | 00/79771 | 12/2000 |
| WO | WO 00/75048 | 12/2000 |
| WO | WO 00/77697 A1 | 12/2000 |
| WO | WO 00/79771 A1 | 12/2000 |
| WO | 01/18732 | 3/2001 |
| WO | WO 01/20844 A1 | 3/2001 |
| WO | WO 01/28887 | 4/2001 |
| WO | WO 01/31558 | 5/2001 |
| WO | 01/43095 | 6/2001 |
| WO | WO 01/39816 | 6/2001 |
| WO | 01/86922 | 11/2001 |
| WO | 03/007623 | 1/2003 |
| WO | WO 03/009224 | 1/2003 |
| WO | 03/036861 | 5/2003 |
| WO | WO 03/081832 | 10/2003 |

| | | |
|---|---|---|
| WO | WO 2004/099921 | 11/2004 |

OTHER PUBLICATIONS

English translation of European Patent No. 1 080 539, which corresponds to WO 99/60713, submitted to the UK Patent Office and attached hereto.

EPO Search Report, Application No. 05 07 6636.9, dated Feb. 7, 2006.

EPO Search Report, Application No. 05 07 6635, dated Jan. 31, 2006.

UK Search Report dated May 15, 2002.

UK Search Report dated Apr. 23, 2002.

International Search Report dated Jan. 30, 2003.

Communication pursuant to Article 96(2) EPC dated Dec. 21, 2006 in counterpart EPO Application No. 02 769 514.7-1246, 6 pages.

Communication pursuant to Article 96(2) EPC dated Feb. 6, 2007 in counterpart EPO Application No. 05 076 635.1-1246, 7 pages.

* cited by examiner

ELECTRICAL DEVICES

This invention relates to electrical devices having attachable components especially portable communications devices such as telephones arranged to operate using a mobile telecommunications network and to attachable components for such portable communications devices.

Telephones that operate using a mobile telecommunications network are variously known as mobile telephones, cellular telephones and cellphones. For simplicity, the term "mobile telephone" will be used hereinafter.

The provision of mobile telephone fascia that may be changed by the end user for, for example, aesthetic or decorative reasons has become popular in recent years.

In one aspect, the present invention provides a mobile telephone housing portion such as a fascia that, when fitted to a mobile telephone, affects the functionality and/or operating characteristics of the mobile telephone.

The mobile telephone fascia may provide the mobile telephone with additional, different or modified functionality or operating characteristics. Different mobile telephone fascias may affect a mobile telephone differently. For example, access to functions or operating characteristics of the mobile telephone may be limited or controlled by the particular fascia fitted to the mobile telephone.

In one aspect, the present invention provides a fascia for a portable communications device such as a mobile telephone, the fascia having a passive data storage device carrying control data (which may be software data and/or information data) that is supplied to a main body of the mobile telephone when the fascia is attached to and/or detached from the main body and which affects the functioning and/or operating characteristics of the mobile telephone.

As used herein the term "passive data storage device" means a device that is not self-powered but that derives power from the main body when the fascia is attached to the main body.

In one aspect, the present invention provides a mobile telephone having a main body and a fascia arranged to fit on the main body, the fascia carrying a passive detectable element and the main body having detection means for detecting the presence of the passive detectable element and control means for controlling the functionality or operating characteristics of the mobile telephone in accordance with control data, wherein the control data accessed by the control means is affected by the presence of a passive detachable element or the presence of a particular passive detectable element. As used herein the term passive detachable element means an element that is not self-powered and that, if it requires a power supply, derives it from the main body when the fascia is attached to the main body.

In an embodiment, the control data may comprise data for at least one of: graphics; mobile telephone services; subscription services; network services; services; promotions; and advertisement; fascia identification data; games software for games that may be played on the mobile telephone including a new game or modifications for such games software already installed on the mobile telephone; and data for enabling a user to access any one or more of the above types of data using their mobile telephone, for example an access code to enable access to control data already stored by the mobile telephone or data such as a telephone number, Internet address or WAP address from which control data can be accessed, or the user's mobile network provider or another third party service provider.

In one aspect, the present invention provides a fascia for a telephone wherein the fascia carries a data storage device carrying identification data that, when the fascia is attached to a main body of the telephone, enables the telephone to determine whether or not the user has access to additional or optional functions of the telephone, for example access to additional optional ringing tones stored by the main body and/or access to games programs or games modifications stored by the main body.

Where a fascia carries a data storage device, the data storage device may be a writable data storage device into which, for example, historical data such as use data may be written. Such data may be accumulated by the main body of the mobile telephone which may control the writing of this data into the data storage device. Data may also be written into a SIM card memory.

In an embodiment, the mobile telephone fascia is provided with apertures through which key pads of a user interface of the telephone project.

In another embodiment, the mobile telephone fascia carries a user interface. The user interface may be at least one of a keyboard, touch screen and so on. Different fascias may carry different types of user interfaces.

The use of a data storage device that does not require its own power supply enables costs to be kept down and, moreover, because such passive data storage devices are relatively cheap to produce and can be incorporated into products relatively easily (for example during a plastics moulding process), the incorporation of the passive data storage device does not add significantly to costs.

Data may be communicated by modulation by the data storage device of a carrier signal supplied by the electronic device or electrical appliance and from which the data storage device derives its power.

In another aspect, the device is an electrical device other than a portable or mobile communications device and the attachable component is at least one of a housing portion or a tool or is, rather than being attachable, arranged to be brought into close proximity with a reader unit carried by the electrical device.

The present invention also provides a tool having such a passive detectable element.

The present invention also provides a tool that is attachable to a main body of an electrical appliance, the tool carrying a passive data storage device such that, when the tool is attached to the main body of the electrical appliance, control data is downloaded from the passive data storage device to the main body to affect the control by the electrical appliance of the operation of the tool.

For example, in the case of a vibratable, reciprocable, oscillatable or rotatable tool, the control data may affect the speed or duration for which the tool is vibrated, rotated oscillated or reciprocated. The control data may be identification data that enables the electrical appliance to determine from its own memory the required drive characteristics (for example speed and duration) for that particular tool or may be instruction data that instructs the electrical appliance how to control the particular tool.

As examples, the electrical appliance may be: a personal care electrical appliance such as dental hygiene device such as an electric toothbrush, a beauty care device such as a skin care device or a hair dryer; a domestic appliance such as a vacuum cleaner, food processor; or a power tool.

Embodiments of the present invention will now be described, by way of example, with reference to the accompanying drawings, in which.

Figure 1:
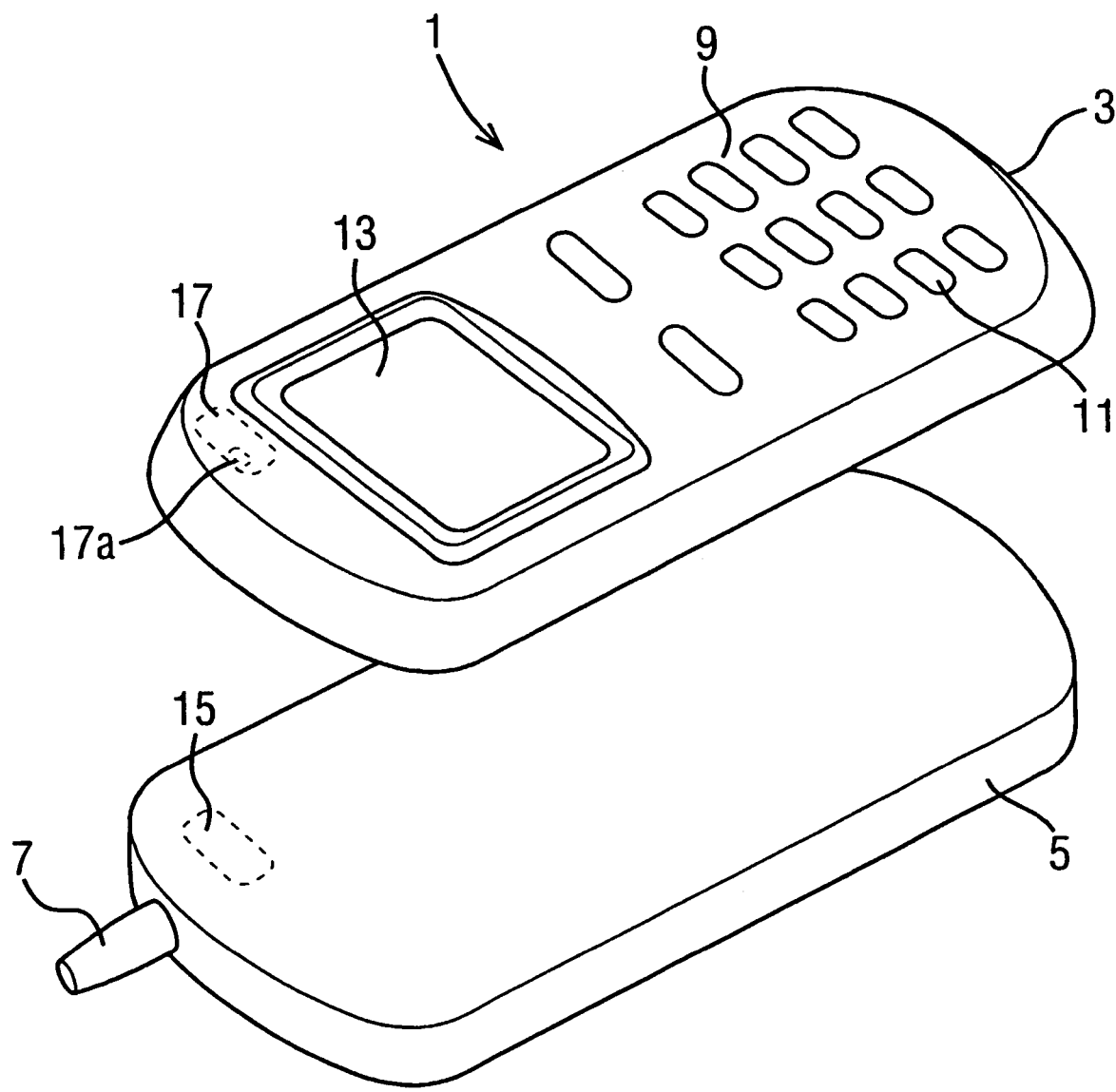
FIG. 1 shows a diagrammatic perspective view of a mobile telephone with a removable fascia embodying the invention separated from a main body of the mobile telephone.

FIG. 1 illustrates a typical mobile telephone or cellphone 1 comprising a main body 5 and an attachable, and in this case also removable, fascia 3. The fascia 3 is formed with a user input array 9 which comprises a plurality of holes 11 for engagement with key pads (not shown) provided on the main body 5 of the mobile telephone 1. The fascia 3 is also provided with, in this example, a transparent plastics window 13 through which a liquid crystal display (LCD) (not shown in FIG. 1) provided on the main body 5 of the mobile telephone 1 can be viewed. The mobile telephone 1 also comprises an aerial 7 which allows telecommunication signals to be transmitted and received.

Mounted upon, or embedded within, an inside surface of the removable fascia 3 is a passive data storage device 17. Generally, the fascia 3 will be moulded from a plastics material and the passive data storage device 17 encapsulated in a housing fitted to (for example embedded in or mounted to the surface of) the fascia 3 during the moulding process.

The main body 5 of the mobile telephone 1 carries a reader unit 15. The reader unit 15 is positioned such that, when the fascia 3 is fitted to the main body 5, the passive data storage device 17 will be in range of, as shown will lie adjacent to, the reader unit 15 so that, as will be described in detail below, couplers of the passive data storage device 17 and reader unit 15 couple to enable the passive data storage device 17 to derive a power supply from a signal supplied by the reader unit 15 and, when so activated, to transmit control data contained in its memory.

Figure 2:
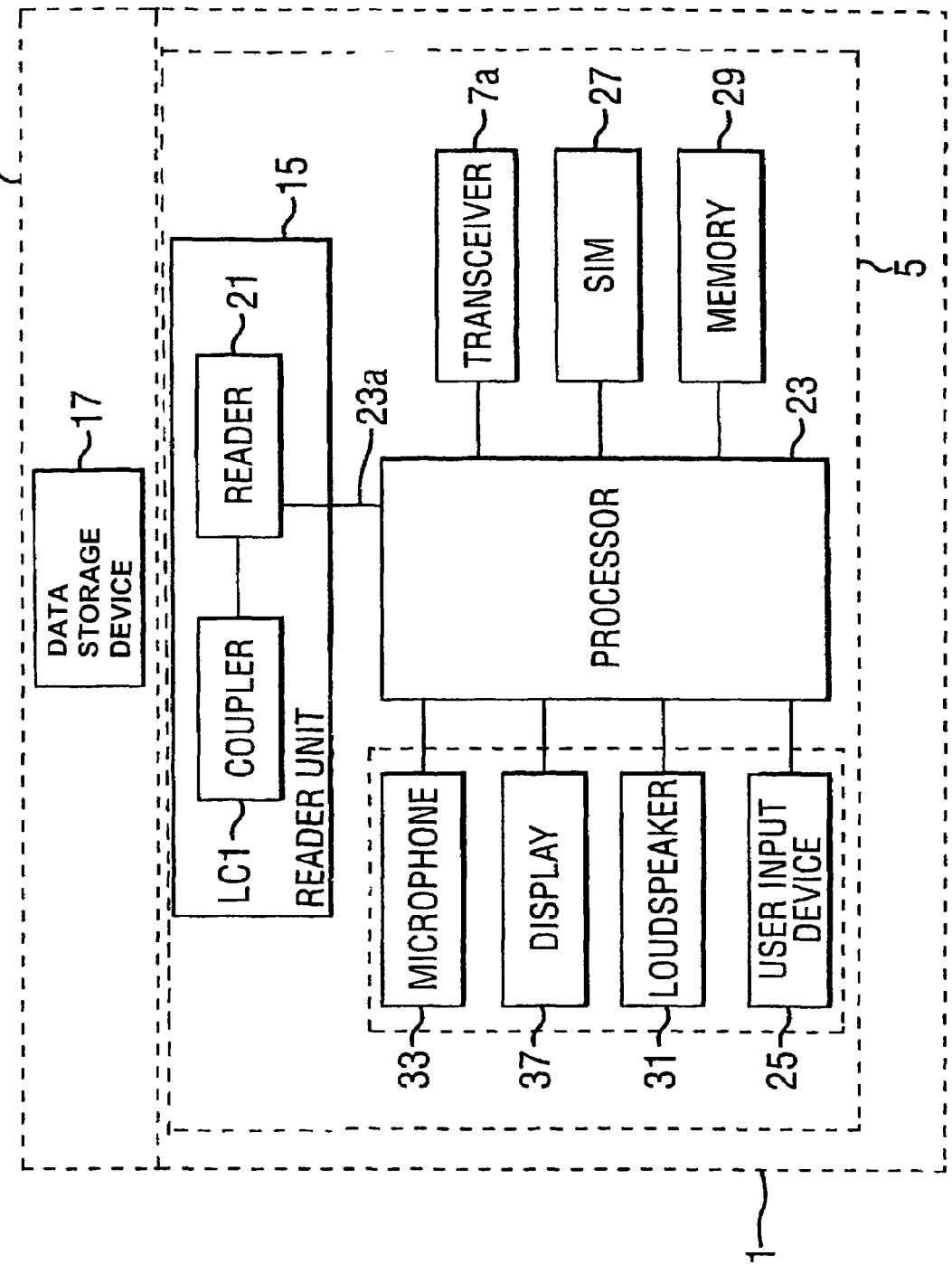
FIG. 2 shows a functional block diagram of functional components of a mobile telephone embodying the invention, including a reader unit for enabling detection of a replacement fascia.

FIG. 2 shows a functional block diagram of the mobile telephone 1. The main body 5 of the mobile telephone 1 comprises: a microphone 33 and a loudspeaker 31 enabling a user to input speech and hear audio output respectively; a user input device 25 (in this case a keyboard) enabling the user to input numbers to be called, other information and instructions for controlling various features of the mobile telephone 1; a display 37 on which incoming or outgoing telephone numbers, SMS text messages and other information can be displayed; and a transceiver 7a which with the aerial 7 shown in FIG. 1 enables transmission and reception of communications over a mobile telecommunications network using, for example, the GSM (Global System for Mobile Communications), GPRS (General Packet Radio Service) or 3G (Third Generation, GSM) system, or future such networks.

The above functional components are coupled, via appropriate interfaces (not shown) to a mobile telephone processor 23 which controls the overall operation of the mobile telephone 1. The mobile telephone processor 23 is associated with a non-volatile memory 29 which has a read-only portion which contains control operation software data and information data and a writable portion that, for example, enables storage of telephone numbers and messages input to the mobile telephone by the user or received by the mobile telephone over the mobile telecommunications network.

As is known in the art, the mobile telephone 1 further comprises a subscriber identification module (SIM) 27. The SIM 27 is a detachable module which provides user specific data and also algorithms and data specific to the operator of the mobile telecommunications service provider. The mobile telephone processor 23 is coupled to the reader unit 15 via line 23a.

The reader unit 15 comprises a reader 21 which is coupled to the mobile telephone processor 23 via line 23a and which is also coupled to a first coupling element or coupler LC1 arranged to couple to a similar second coupling element LC2 (see FIG. 4) carried by the passive data storage device 17 when the replacement fascia or cover portion 3 is fitted to the main body of the mobile telephone.

Although not shown in FIG. 2, it will be appreciated that the components of the mobile telephone 1 and the reader unit 15 will be powered by the battery of the mobile telephone 1, although a separate power supply may be provided.

Figure 3:
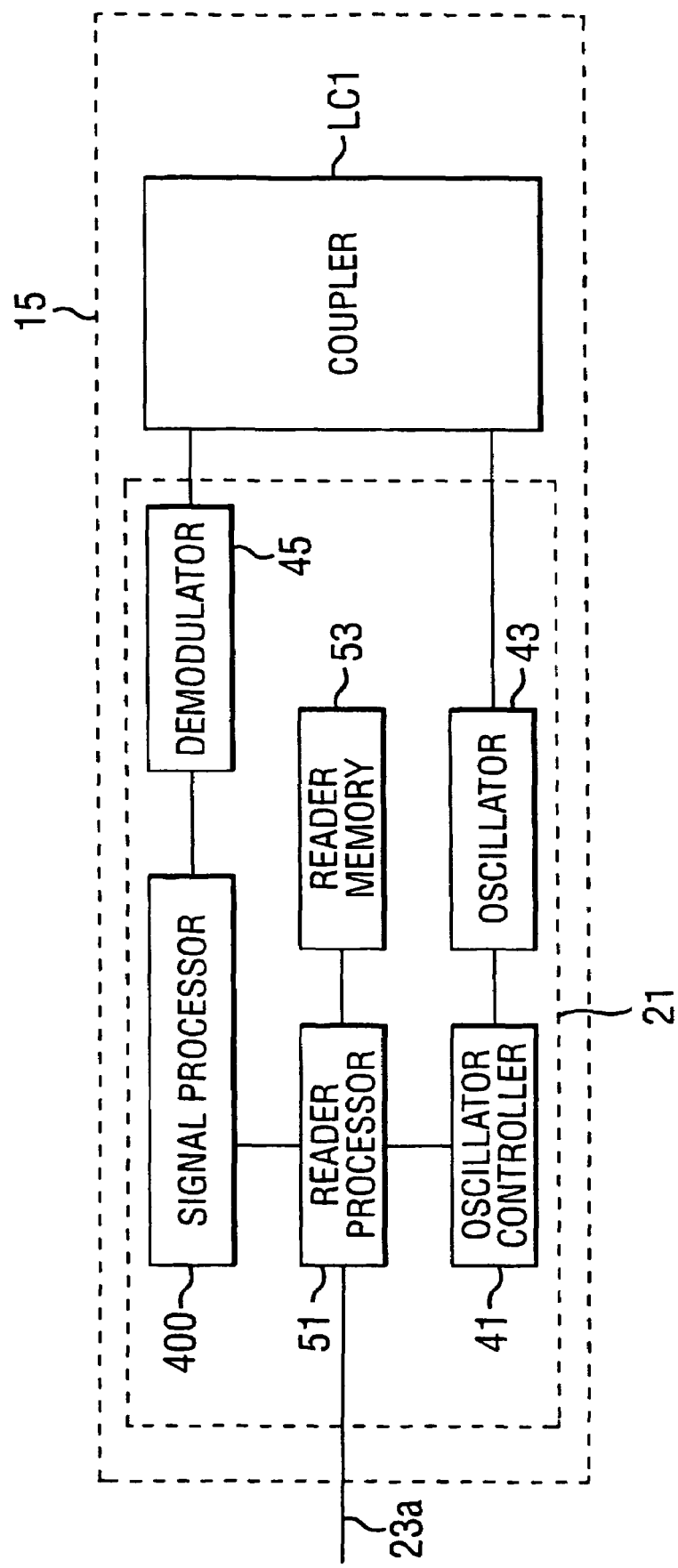
FIG. 3 shows a functional block diagram of an embodiment of the reader unit shown in FIG. 2.

FIG. 3 shows an embodiment of the reader unit 15 which consists of the coupling element or coupler LC1 and the reader 21. The reader 21 has a reader microprocessor or microcontroller 51 having a memory 53 which will generally be non-volatile but could be volatile if backed-up, for example battery backed-up. An oscillator 43 controlled by an oscillator controller 41 under the control of the reader microprocessor 51 supplies an oscillator output signal to the coupling element LC1. The reader microprocessor 51 controls the oscillator control 41 to control activation of the oscillator 43 and, in this embodiment, also controls the oscillator control 41 to interrupt the output of the oscillator 43 to provide a signal from which the data storage device 17 within the fascia 3 can derive a clock signal as will be described below.

The first coupling element LC1 is also coupled to a demodulator 45 which enables the modulation to be recovered from an amplitude modulated signal. The recovered modulation is supplied to signal processor 400 which supplies a digital signal representing a string of binary ones and zeros to the reader microprocessor 51. In response to receipt of control data from the passive data storage device, the reader microprocessor 51 communicates with the mobile telephone processor 23 on data line 23a (see FIG. 2) so as to affect the functionality or operating characteristics of the mobile telephone.

Figure 4:
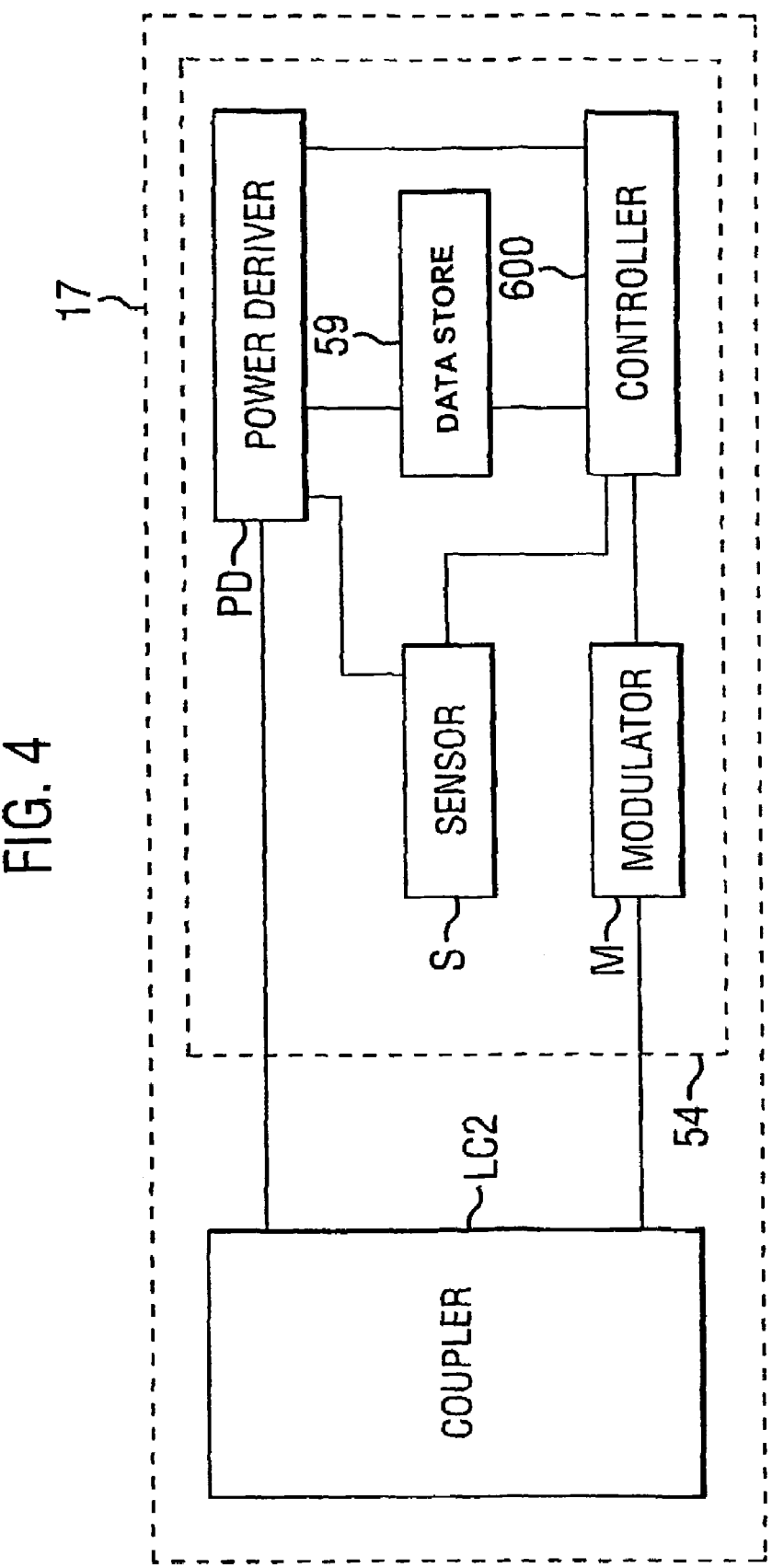
FIG. 4 shows a functional block diagram of an example of a passive data storage device.

FIG. 4 shows a simplified block diagram of one example of a passive data storage device forming the detectable component 17. As shown, the passive data storage device 17 comprises a passive data storage unit 54 and the coupler or coupling element LC2. The passive data storage unit 54 consists of a power deriver PD that derives a power supply for the passive data storage unit from the oscillator signal coupled from the reader unit 15 (shown in FIG. 3) to the passive data storage device 17 by coupling of the first and second coupling element LC1 and LC2, a data store 59 in the form of a non-volatile memory storing control data for supply to the reader unit 15 and a controller 600 for controlling reading of data from the data store 59 and supply of that data to a modulator M that modulates the oscillating signal inductively coupled to the passive data storage device 17. Optionally, the passive data storage device may include a sensor S for reasons that will be set out below.

Figure 5:
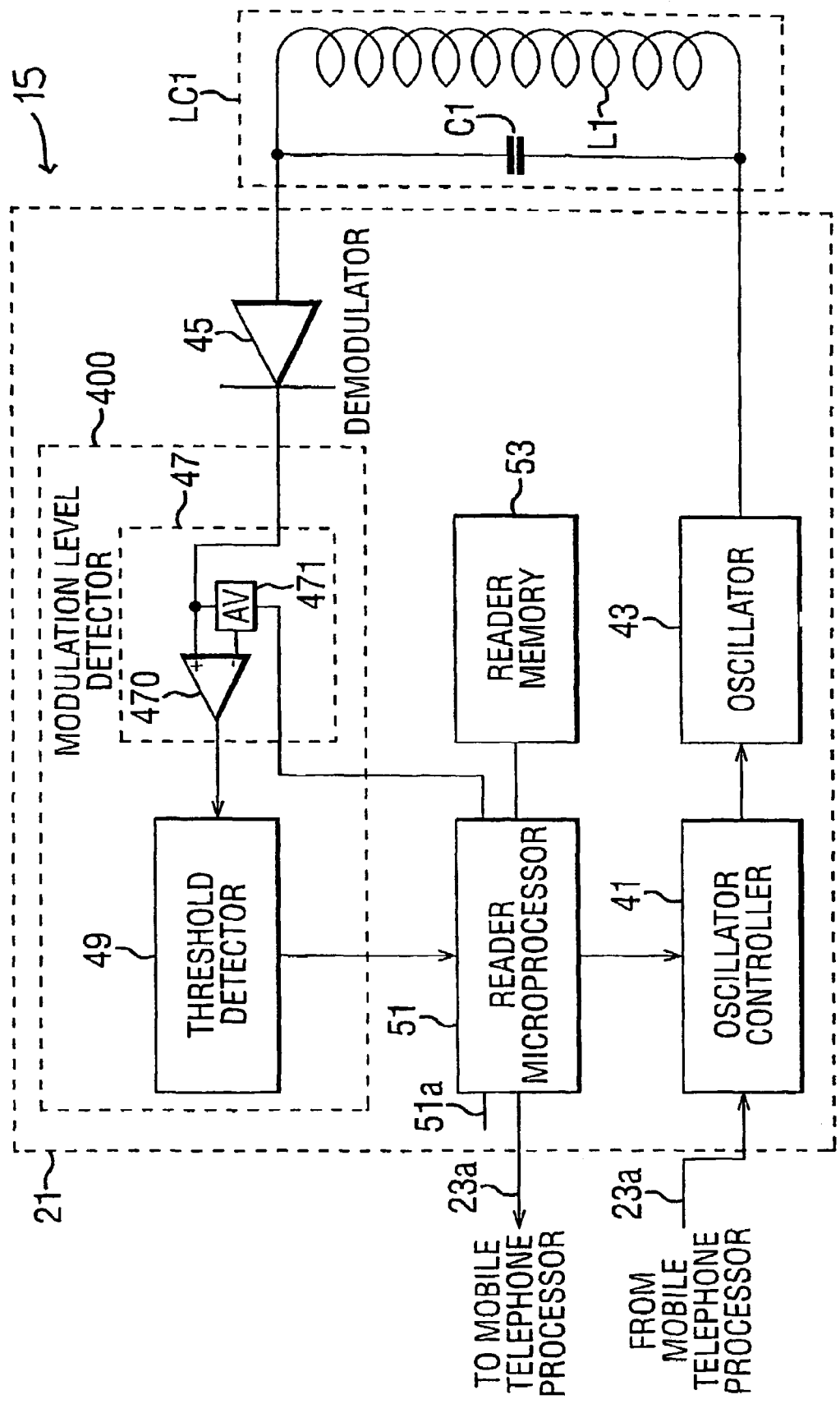
FIG. 5 shows a more detailed functional block diagram of an embodiment of the reader unit.
Figure 6:
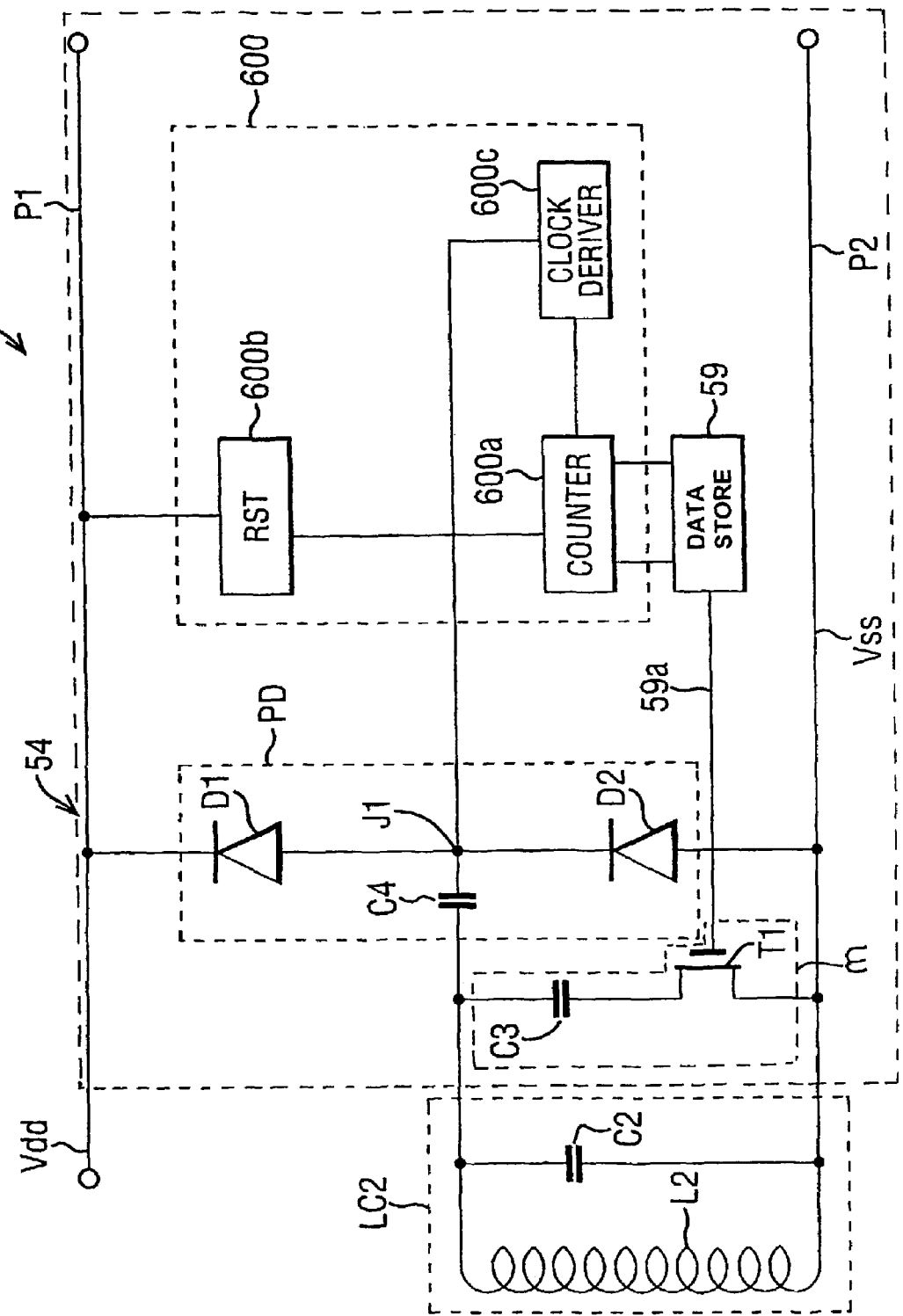
FIG. 6 shows a more detailed functional block diagram of one example of a passive data storage device.

FIGS. 5 and 6 show, respectively, block diagrams illustrating one example of the reader unit 15 and one example of the passive data storage device 17. In this example, the passive data storage device 17 and reader unit 15 are adapted to communicate via inductive coupling and each of the couplers LC1 and LC2 consists of a parallel connection of a capacitor and an inductor C1 and L1 and C2 and L2, respectively. The inductive couplers may form a tuned circuit, although this is not necessary at short range. The optional sensor S is not shown in FIG. 6.

In the example shown in FIG. 5, the demodulator 45 is a simple diode rectifier while the signal processor 400 consists of modulation level and threshold detectors 47 and 49. The modulation level detector 47 comprises a comparator 470 and an averaging circuit 471 controlled by the reader microprocessor 51. The output from the demodulator 45 is supplied to the positive input of the comparator 470. The average of the output of the demodulator 45 is supplied by the averaging circuit 471 to the negative or inverting input of the comparator 470.

The output of the comparator 470 is supplied to the threshold detector 49 which supplies to the reader microprocessor 51 either a one or a zero, depending upon the relationship between the signal and the threshold.

In this example, the oscillator controller 41 is a logic circuit or a transistor switch which controls the oscillator 43 to switch on or off the carrier signal to the first coupling element LC1 in accordance with a signal received from the reader microprocessor 51 and the averaging circuit 471 generally consists of an averaging capacitor connected between the inverted input of the comparator 470 and ground by a transistor switch or transmission gate which is controlled by the reader microprocessor 51 so as to be conducting while the carrier signal is present and after transients have settled but is off while the carrier is off and during carrier turn-on transients so that averaging is only carried out while there is a steady carrier signal.

As shown in FIG. 6, the power deriver PD of the passive data storage unit 54 comprises series-connected diodes D1 and D2 and a capacitor C4 coupled between the coupling element LC2 and a junction J1 between the anode of the diode D1 and a cathode of the diode D2. The cathode of the first diode D1 is connected to a first power supply rail P1 (Vdd) while the anode of the second diode D2 is connected to a second power supply rail P2 (Vss). The capacitor C4 and the diodes D1 and D2 act effectively as a voltage doubler enabling the peak to peak voltage of a received AC or oscillating signal inductively coupled to the passive data storage device 17 by the coupling elements LC1 and LC2 to be used by the diodes D1 and D2 to derive a power supply for the passive data storage device 54 from the oscillating signal.

It will, of course, be appreciated that, in the interests of simplicity, the power supply connections to the remaining components of the passive data storage device 17 are not shown in FIG. 6.

In this example, the controller 600 comprises a clock signal deriver 600c in the form of a missing pulse detector which is coupled to the junction J1 to derive a clock signal for the data storage unit 54 from the interrupted oscillator signal supplied by the oscillator 43 and an address counter 600a clocked by the clock signal. The controller 600 may also include a reset switch 600b to reset the counter 600a if the passive data storage device 54 is not powered for a predetermined time.

In this example, the controller 600 causes data to be read out from the data store 59 directly to the modulator M which comprises a series-connection of a FET T1 and a capacitor C3 coupled across the capacitor C2 of the coupler LC2. Thus, an output 59a of the data store 59 is coupled to the gate of the FET T1. In this example, the data store 59 is a serial read-only memory (ROM). It may, however, be any form of non-volatile memory that does not require battery backup such as a ROM, an EE-PROM (electrically erasable programmable ROM), a flash memory, F-RAM and so on.

When, as shown in FIG. 1, the replaceable fascia 3 is fitted to the main body 5 of the mobile telephone 1 the coupling element LC1 of the passive data storage device 17 lies adjacent and in close proximity to the coupling element LC2 of the reader unit 15, inductively coupling the passive data storage device 17 to the reader unit 15. The oscillator 43 of the reader 21 generates a high or RF (radio frequency), typically 13.56 MHz (MegaHertz), signal which is supplied to the first coupling element LC1 and inductively coupled to the passive data storage device 17 via the second coupling element LC2. The voltage doubler formed by capacitor C4 and diodes D1 and D2 thus derives a power supply for the passive data storage device and, when powered, the clock deriver 600c derives a clock signal from the interrupted oscillator signal and control data is output from the data store 59 on output 59a under the control of the counter 600a.

When control data is output by the data store 59 on the output line 59a, the data switches the FET T1. The loading across the inductor L2 varies in dependence upon whether the FET T1 is conducting or non-conducting, causing the oscillating signal to be modulated in accordance with the control data output from the data store 59.

The control data output from the data store 59 is extracted from the modulated oscillating signal by the demodulator 45, modulation level detector 47, threshold detector 49 and reader microprocessor 51 to provide a data input signal to the mobile telephone processor 23 (FIGS. 2 and 3) representing the data output from the data store 59.

The control data output from the data store 59 and downloaded by the reader microprocessor 51 (FIG. 5) to the mobile telephone processor 23 (FIG. 2) may then be stored in the writable portion of the memory 29. This control data may comprise at least one of software data, that is computer code executable or implementable by the mobile telephone processor 23, and information data that is stored in the memory 29 so as to be usable by the mobile telephone processor 23. As an example of software data, the data downloaded from the passive data storage device may include upgrades or modifications of the mobile telephone processor software where the fascia is supplied by or under licence from the manufacturer or supplier of the mobile telephone. Additionally or alternatively, software data may include updates or modifications to existing games software provided with the mobile telephone or new games software.

Information data may be provided as an alternative to or in addition to software data. Examples of information data that may be stored by the data store 59 include dialling or ringing tones and telephone numbers, Internet addresses and/or WAP addresses enabling, for example, the supplier of the fascia to attract buyers by supplying new ringing tones and/or to advertise itself or other companies by supplying their telephone numbers, Internet addresses or WAP addresses. Other examples of control data may include graphics data, audio data, image data, video data, biometric data, mobile telephone services, subscription services, network services, promotions, advertisements and so on.

As described above, the control data stored by the passive data storage device consists of the actual software and/or information data or the identity or address of the user's mobile network provider or another third party, service provider. As another possibility, the control data stored by the passive data storage device may be access data that enables the user to access such software and/or information data. For example, this access data may consist of a mobile telephone number or a WAP address that the user of the mobile telephone can contact to download new software data and/or information data or the identity or address of the user's mobile network provider or another, third party, service provider. As another possibility, downloading of access data may cause the mobile telephone processor 23 to make additional facilities for which the mobile telephone processor is already programmed but that are currently barred from the user available to the user, for example facilities such as international calling access, voicemail and message-taking facilities. As a further possibility, such access data may cause the mobile processor 23 to enable the user to access data previously stored in the memory 29 but not accessible to the user. Such data may include information data such as ringing tones, telephone numbers and/or WAP addresses and software data such as modifications to the processing software of the mobile telephone and/or upgrades or modifications to games software already available to the user or new games software.

The access data may be, for example, an identity code that enables the mobile telephone processor 23 to identify the particular type of fascia 3 by comparison with data stored in its memory. The mobile telephone processor 23 may then control the mobile telephone functionality and capability available to the user in accordance with the identified fascia 3.

The mobile telephone processor may be programmed so that, if it receives no control data or receives incorrect or non-understandable control data (for example if it receives the wrong access or identity code data), then the mobile telephone processor 23 may determine that the fascia is a counterfeit or unrecognised fascia and may modify or restrict the functionality of the mobile telephone. The mobile telephone processor 23 may inhibit access to all or certain optional features or functions and may continue to inhibit use of those optional features or functions until a genuine fascia is fitted to the mobile telephone. For example, if the mobile telephone processor 23 determines that the fascia is a counterfeit fascia, then the mobile telephone processor 23 may simply limit the number of functions available via the mobile telephone, for example the mobile telephone processor 23 may limit the available number of ringing or dialling tones or message taking options, for example, or may "lock" the mobile telephone so that only emergency outgoing calls may be made.

The mobile telephone processor 23 may also display a message to the user to alert them to the fact that the replacement fascia is not genuine. Where the use of a non-genuine replacement fascia is not detrimental to the functioning of the mobile telephone and does not potentially detrimentally affect the safety of the user, then the mobile telephone processor 23 may simply display a message to the user on the display 37 to alert the user to the fact that the fascia is not genuine.

The mobile telephone processor may also be programmed to enable it to identify genuine replacement fascias for other models of mobile telephone and to cause the display 37 to display to the user a message alerting them to the fact that the incorrect replacement fascia has been fitted if the mobile telephone processor determines that incorrect identity data has been received.

As described above, the passive data storage device is powered and so supplies its stored data to the reader unit 15 whenever the first and second coupling elements LC1 and LC2 are inductively coupled. The reader microprocessor may send the received data continually or periodically to the mobile telephone processor 23. Continually powering the passive data storage device 17 may, however, present a drain on the battery of the mobile telephone. Accordingly, the reader microprocessor 51 may be programmed to cause the oscillator control 41 to switch on the oscillator 43 only at predetermined intervals so that the passive data storage device 17 is periodically activated to send its data. Generally, it will be desirable for the passive data storage device 17 to transmit its data to the reader unit 15 only when a replacement fascia 3 has just been coupled to the main body 5 of the mobile telephone. This may be achieved by using a simple interlock system which provides a signal to the reader microprocessor 51 indicating whether or not a fascia 3 is present. As an example, part of the encapsulating housing of the passive data storage device 17 may carry a conductive strip (17a in FIG. 1) that, when the fascia 3 is coupled to the main body 5, couples a pin (51a in FIG. 5) of the reader microprocessor 51 to ground or earth and the reader microprocessor 51 may periodically check the status of that pin. When the reader microprocessor 51 detects that the voltage at the pin 51a has gone high then it determines that the fascia 3 has been removed and when it detects that the voltage at that pin has again gone low it determines that either the fascia 3 has been refitted to the main body 5 or a different fascia 3 has been fitted and so activates the oscillator control 41 to switch on the power oscillator 43 to power up the passive data storage device 17. In this way, the passive data storage device 17 will be powered up to transmit its data only when a replacement fascia 3 or cover portion is fitted to the main body 5.

In the above described embodiments, the passive data storage device 17 is a synchronous passive data storage device, that is the clock signal of the passive data storage device 17 is controlled by and so synchronised with the reader microprocessor 51. However, the passive data storage device 17 may be an asynchronous device, that is the clock deriver 600c coupled to the junction J1 shown in FIG. 6 may be replaced by a clock signal generator which is powered up when a power supply is derived by the passive data storage device to generate an independent clock signal for the passive data storage device. Also, although FIG. 6 shows the use of a counter 600a to count out data from the data store 59 it will, of course, be appreciated that the data store 59 may be arranged simply to output its data an address at a time and that the counter 600a may not be necessary. In addition, the passive data storage device 17 may incorporate a microcontroller that controls read out of data from the data store 59 which may enable different areas of the data store 59 (and so different data) to be accessed and read out in accordance with instructions supplied by the reader microprocessor 51. Such instructions may be transmitted by representing 0 and 1 as long and short duration interruptions of the oscillator signal.

In the above described embodiments, the passive data storage device modulates the signal received from the reader by, under control of the counter 600a and clock divider 600c, reading data out of the data store 59.

Figure 7:
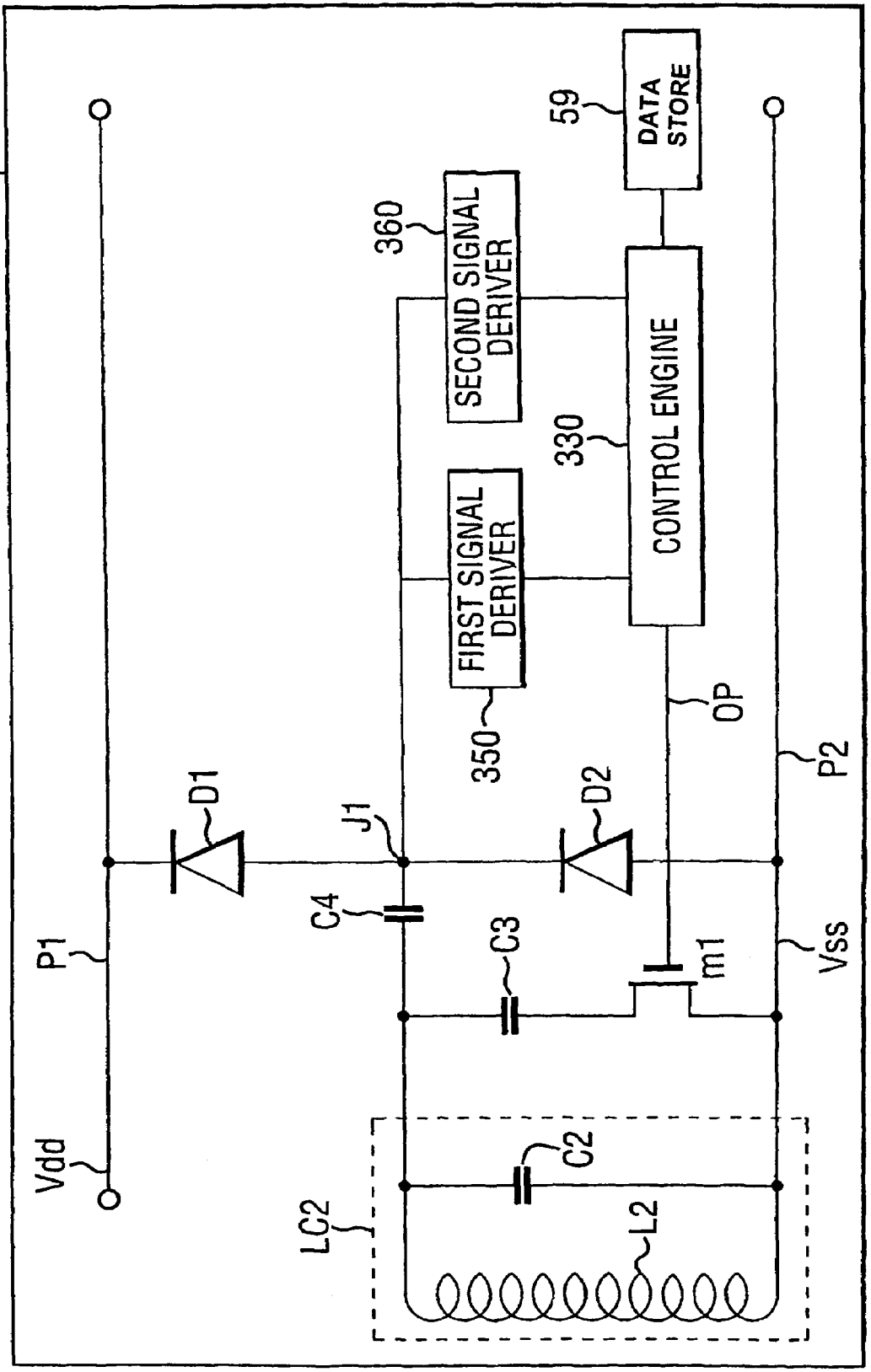
FIG. 7 shows a functional block diagram of another example of a passive data storage device.

FIG. 7 shows an example of another passive data storage device 17' that may be used in place of the passive data storage device 17 shown in FIG. 6. This data storage device uses a different controller from that shown in FIG. 6. In this case, the controller comprises a control engine 330 arranged to recognise a number of different codes (in the form of predetermined sequences of ones and zeros) transmitted to it by the reader microprocessor 51. In this example, the reader microprocessor 51 is arranged to transmit ones and zeros by causing the oscillator control 41 to interrupt the output of the oscillator 43 for short and long durations, respectively.

In this embodiment, a clock signal for the control engine 330 is derived from the signal supplied by the oscillator 43 by a first signal deriver 350 in the form of a fast missing pulse detector coupled to junction J1 while the control engine 330 is arranged to extract the data transmitted by the reader 17' using the output of the first signal deriver 350 and the output of a second signal deriver 360 in the form of a slow missing pulse detector also coupled to the junction J1.

The timeout periods of the fast and slow missing pulse detectors are set so that the output of the fast missing pulse detector will have one of two widths dependent upon whether the particular data bit is a binary "zero" or a binary "one" while the slow missing pulse detector will provide a pulse only when a particular data bit is a binary "one". The control engine 330 can thus determine from the outputs of the first and second signal derivers 350 and 360 whether a received bit is a binary "zero" or a binary "one". As set out above, the control engine 330 is programmed to enter a number of different states dependent upon the instruction code received from the reader unit 15. These different states may cause the control engine to read out data from different areas of the data store 59. The data store 59 may, however, be an electrically erasable memory in which case at least one of the states of the control engine 330 may enable the control engine to erase the data in a portion of the data store 59 and to write new data supplied by the reader unit 15 into the data store 59. This would enable, for example, the reader unit 15 to overwrite at least a part of the content of the data store 59 after the fascia 3 has first been coupled to the main body 5 so as to limit or inhibit access to the functionality provided by the data stored in the data store 59 if the fascia is subsequently removed and fitted to a different mobile telephone. As another possibility, the mobile telephone processor may be programmed to place a time limit on the availability of the additional functions provided by the data stored in the data store 59.

Although in the above-described embodiment, the control engine 330 is a state machine with its own non-volatile memory it will, of course, be appreciated that the state machine may be replaced by an appropriately programmed microprocessor or microcontroller also having its own memory. Also, different methods for communicating instructions from the reader unit 15 to the control engine 330 may be used.

Where, as described above, the data store 59 is writable, then it may also be used to extend the memory capacity of the mobile telephone to store further telephone numbers and/or other data. The passive storage device 17 may also be used to provide a record of historical degree and frequency of use of the mobile telephone. Further details of the writing and reading operations that may be carried out by the control engine 330 are to be found in UK Patent Application number: 0031518.4 or the corresponding PCT application number GB01/05690, the whole contents of each of which are hereby incorporated by reference. Data may also be written to the mobile telephone SIM card by the reader unit and mobile telephone processor.

In the above described embodiments, the actual components of the user interface keypads or keyboard are carried by the main body of the mobile telephone and the fascia 3 simply provides apertures through which the keypads extend.

Figure 8:
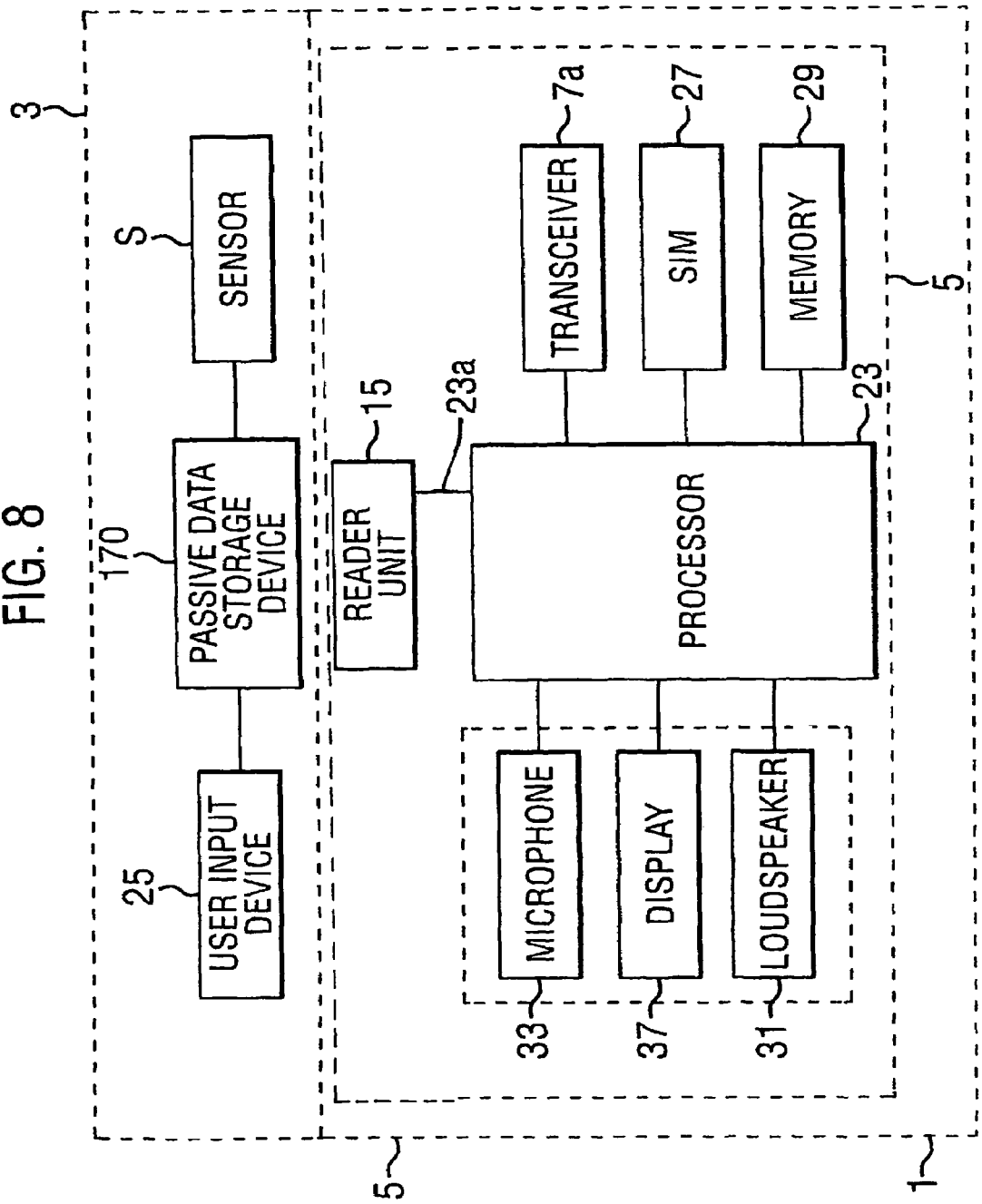
FIG. 8 shows a functional block diagram of another example of a mobile telephone embodying the present invention.

FIG. 8 shows a functional block diagram, similar to FIG. 2, of another example of a mobile telephone in accordance with the present invention. This mobile telephone differs from that shown in FIG. 2 in that the user input device 25, in this example the keyboard, is provided within the fascia 3 and is arranged to communicate with a passive data storage device 170 that, when the fascia 3 is fitted to the main body 5 of the mobile telephone, derives a power supply from the signal supplied by the reader oscillator 43 as described above and, in response to input by the user to the user input device 25, communicates this input to the reader unit 15 by modulating the oscillator signal in a manner similar to that described above. In this case, the fascia may include an optional sensor S coupled to the passive data storage device.

Figure 9:
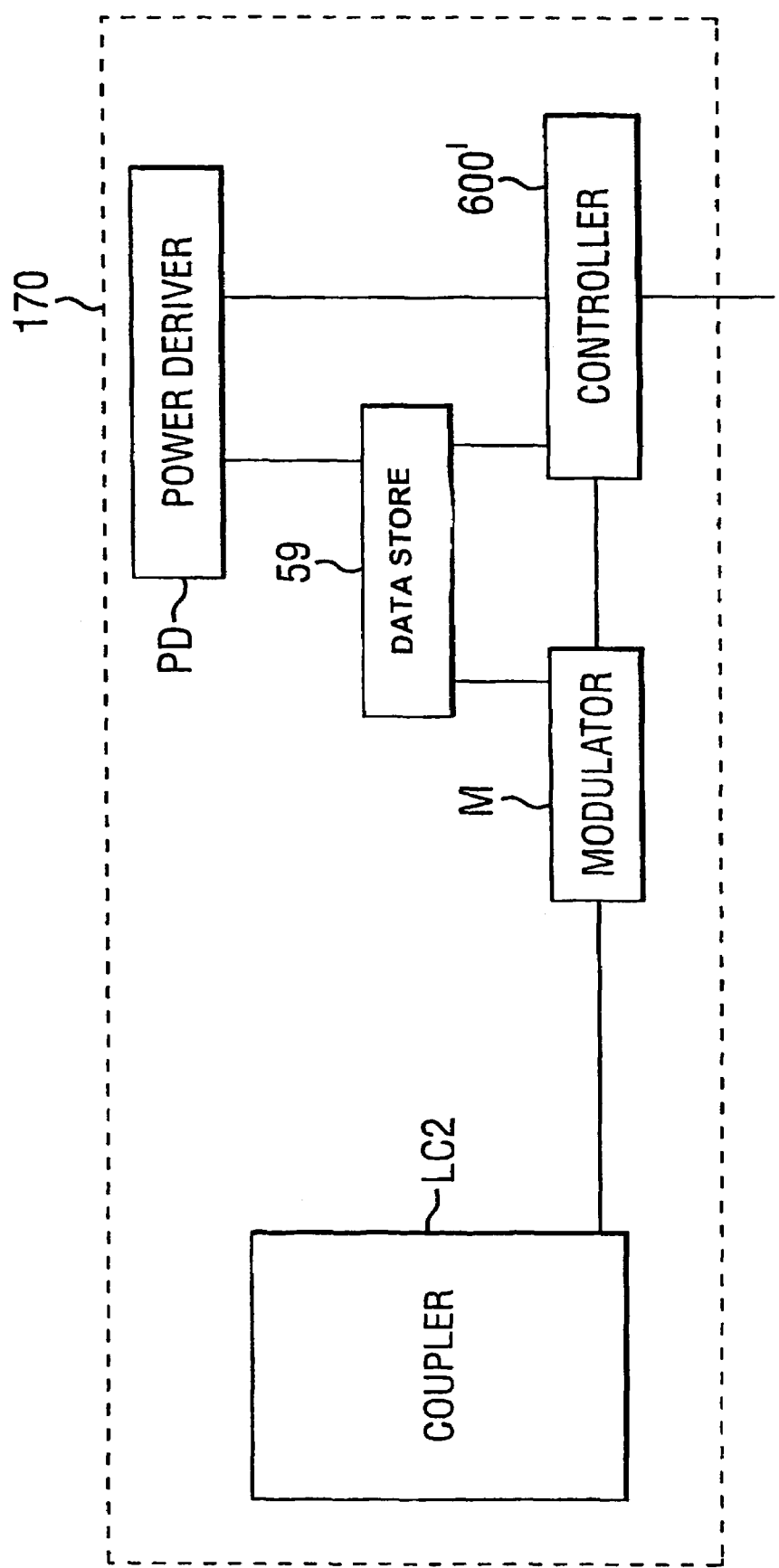
FIG. 9 shows a functional block diagram of an example of a passive data storage device for use as a detectable control device shown in FIG. 8.

FIG. 9 shows a functional block diagram of the passive device 170. This passive data storage device is similar to that shown in FIG. 7 with the controller 600' having the configuration described above with reference to FIG. 7 (that is it will include a control engine in the form of a state machine, microprocessor or microcontroller with its own memory). The passive data storage device 170 differs from that shown in FIG. 7 in that the controller 600' incorporates a keypad or keyboard scanner (either by programming the controller or possibly by providing a dedicated user input interface) to enable it to communicate with the user input device 25 shown in FIG. 8 and, in response to keystrokes made by the user of the user input device 25, to communicate to the reader unit 15 shown in FIG. 8 code data (a predefined sequence of zeros and ones) that will identify to the mobile telephone microprocessor 23 the key that has been activated or depressed by the user. The passive data storage device 170 communicates this data in the same manner as described above, that is by the controller 600' causing the modulator M to modulate the oscillator signal supplied by the reader unit 15 unit in accordance with the data to be transmitted.

Any known form of code for identifying the keypads may be used, for example, the ASCII code system may be used. The data store 59 stores control data of the type described above, that is software data and/or information data that affects the functionality of the mobile telephone. In this case, the controller 600' of the passive data storage device 170 is programmed so as to download or communicate to the reader unit 15 control data from the data storage device 170 when the fascia is first fitted or first refitted to the main body 5 of the mobile telephone 1 and then subsequently to monitor keypad activation by the user and to communicate keystrokes input by the user to the reader unit 15 as described above.

Placing the entirety of the keyboard in the fascia 3 means that it is not necessary for the interior shell of the main body 5 of the mobile telephone to be riddled with holes corresponding to the keypad (which reduces the efficacy of any electromagnetic interference (EMI) shielding). Rather, the manufacturer of the mobile telephone should be able to use a continuous shielding layer, apart from coupling connections required to connect to the display.

Providing the entirety of the user input device 25 within the fascia 3 means that the mobile telephone may be fitted with different fascias for different applications, for example, a mobile telephone fascia that facilitates use as a mobile telephone and a games fascia that facilitates playing of a game.

Figure 10:
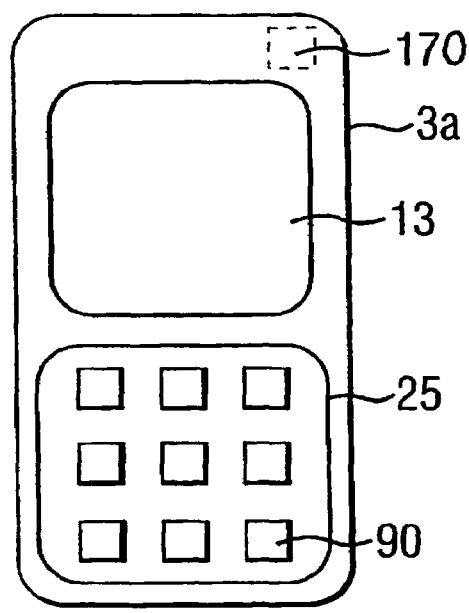
FIGS. 10 to 12 are very diagrammatic views of examples of user input devices.
Figure 11:
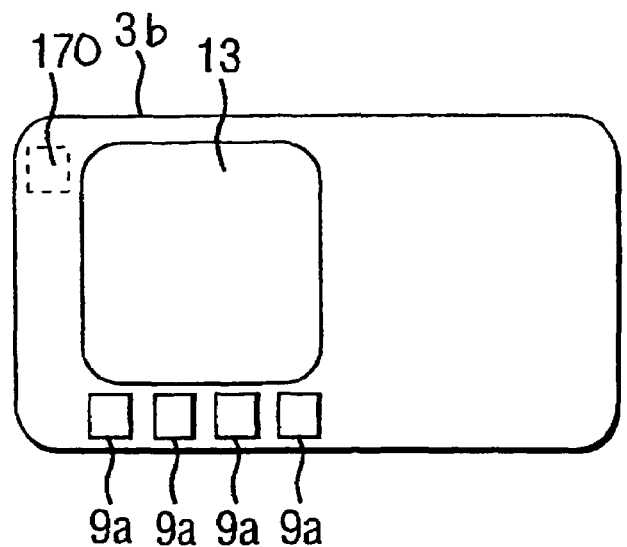

FIGS. 10 and 11 illustrate schematically examples of the front surfaces of two such fascias 3a and 3b. In each case, the display window 13 has the same size and dimension but in FIG. 11 the display window 13 and user input device 25 are arranged so that the display is viewed in a landscape orientation while in FIG. 10 the display is viewed in a portrait orientation.

The fascia 3a shown in FIG. 10 has a keyboard 25 with a keypad 90 arrangement similar to that indicated by FIG. 1.

In the fascia 3b shown in FIG. 11, the keyboard 25 is replaced by games key inputs 9a each of which corresponds to a gaming control function, analogous to those present on a computer games console.

Separating the user input device 25 from the main body 5 of the mobile telephone enables the position, type, number and size of the keys 9a, 90 to be varied without affecting the functionality of the main body of the mobile telephone. All that is required is that the mobile telephone processor can identify from control data downloaded from the passive data storage device 170 when the fascia is first fitted, the type of user input device 25 and can then respond to the key stroke data code communicated to it from the passive data storage device 170. The control data also enables the mobile telephone processor to determine the use orientation of the display and to control the LCD accordingly.

This enables, as will be appreciated from FIGS. 10 and 11, the user to attach to the main body 5 a fascia carrying a user input device appropriate to the task that he wishes to carry out. Thus, as described above, a dedicated games fascia may be provided. In addition to providing a different keypad layout, the keypads themselves may be differently constructed so that, for example, soft more reactive keypads may be provided in the games fascia to allow better, faster game play. In addition, it may also be possible to build a simple joystick into the games fascia to facilitate games play.

In addition to telephone and games applications, where the mobile telephone also doubles as a personal digital assistant (PDA) having, for example, word processing and/or spreadsheet facilities, then different fascias may be provided for these options so that, for example, instead of a mobile telephone type keypad, a fascia adapted for word processing may carry, providing sufficient space is available, a full QWERTY type keyboard.

As another possibility, where the weight of the mobile telephone or PDA is a consideration or only limited functions are required, for example whilst the user is on holiday, then a small minimalistic user input device 25 with a limited number of keypads may be provided. Also, where the user wishes to lend the mobile telephone to a younger family member, then fascias having a "restricted use" user input device may be fitted that restricts the functions of the mobile telephone that the younger family member can access.

In addition, the passive data storage device may store "macros" relating to certain keys allowing, for example, high speed input of words that relate to that particular fascia. Thus, for example, a fascia designed for use by football supporters may have words such as "goal", "net", "idiot!" and so on associated with keys of the fascia while a business fascia may have a passive data storage device that stores macros for phrases such as "call you later", "meet me at", "time", in each case facilitating, for example, the sending of text messages. In each case, because the user input device is independent of the main body or mother unit of the mobile telephone, the actual keypads may carry visual identifiers identifying the macros with which they are associated. In addition, the passive data storage device may contain as part of the control data, spell checkers, crosswords, word translators, dictionaries etc facilitating use of the mobile telephone as an educational tool.

As will be appreciated, because the user input interface device is independent of the main body 5 of the telephone, specialist keypads that enable greater levels of touch or pressure sensitivity may be provided and the controller 600' of the passive data storage device programmed to respond to different degrees of touch or pressure in a predetermined manner enabling, for example, different types of characters for example, upper, lower, bold, italics and so on, to be generated dependent on how hard the key is pressed. Such a fascia may also be specifically adapted to facilitate drawings of graphics with different keys controlling drawings of lines in different directions with the extent or thickness of the line being determined by the user pressure on the keypad or even some of the keypads being associated with simple graphical shapes such as circles, squares etc. The passive data storage device and mobile telephone processor may also be programmed to communicate data relating to musical notes and, for example, a dedicated fascia may be provided that enables the user to create tunes using different levels of pressure of touch to change the note or key, for example. Such a fascia may also be specifically adapted to enable its use by a person with a disability. For example, the fascia may be specifically adapted for use by a person having, for example a physical, visual, hearing or mental disability. As examples: a fascia may be specifically adapted for use by a visually impaired or blind person by providing the user input with specific tactile features; a fascia may be specifically adapted for use by a hearing impaired or deaf person by providing the user input with a speech-to-text facility that enables a telephone text mode; a simplified fascia may be provided with symbols and icons for people with learning difficulties; and a fascia may be provided that enables single switch operation by scanning for people with physical disabilities. As a further possibility, a fascia may provide a link to a telephone relay service such as "Typetalk" for use by hearing impaired or deaf people.

Figure 12:
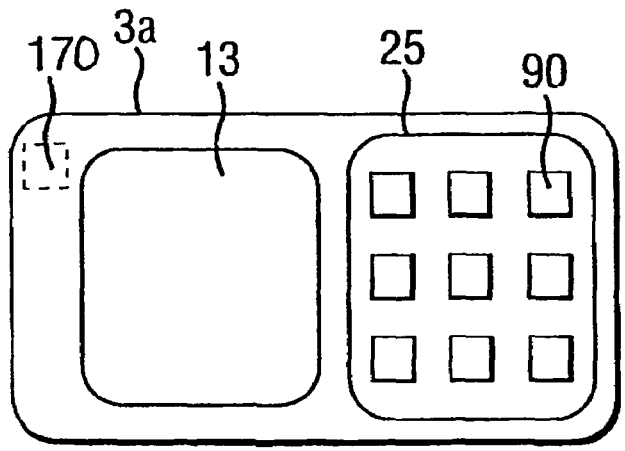

In the above described examples, separate fascias carrying the user input device are provided for different functions. As another example, the passive data storage device may contain an orientation sensor (shown as sensor S in FIGS. 4 and 8) that enables the controller of the passive storage device to determine the orientation of the mobile telephone and thus of the fascia so that, when the mobile telephone is in the orientation shown in FIG. 10, the passive data storage device instructs the mobile telephone processor to control the display in the portrait orientation while when the mobile telephone is in the orientation shown in FIG. 12, the passive data storage device instructs the mobile telephone processor to control the LCD display in landscape orientation, facilitating its use for graphics and games play. In this case, the user input device 25 itself would be physically identical in both orientations but the control signals supplied by the controller of the passive data storage device to the main body 5 of the mobile telephone in accordance with keystrokes made by the user will depend upon the orientation of the fascia.

As another possibility instead of using an orientation sensor, the fascia may carry a user input, for example one of the keypads that, when depressed, instructs the controller of the passive data storage device to communicate with the mobile telephone processor so that the orientation of the display is switched from portrait to landscape or vice versa.

The optional sensor S shown in FIGS. 4 and 8 need not necessarily be an orientation sensor but could be, for example, an environmental sensor sensitive to any one or more of temperature, humidity, sound, odour, a fluid, a gas, water, magnetic field, radio frequency, infra red, vibration, a chemical, pressure, for example, e.g. a barometrics sensor, orientation, position, height, or light that provides, via the first and second couplers, a signal regarding the environmental conditions to the reader unit that affects the overall operation of the mobile communications device. For example, where the sensor is a light sensor, then the reader unit may be supplied with a low light signal that automatically causes the processor of the mobile communications device to activate a back light or where the sensor senses noise level the reader unit may cause the mobile telephone audio volume to be raised or lowered depending upon the ambient noise sensed by the sensor.

In the above described embodiments, the reader unit 15 is, as shown in FIG. 2, separate from the main components of the mobile telephone. The reader unit 15 may, however, be provided within the main components of the mobile telephone. For example, the reader unit may be provided in the SIM card so that it is not necessary to adapt the reader unit for different hardware.

In the above described examples, the user input device 25 carried by the fascia is the keyboard or key input. It may, however, also be possible to incorporate into the fascia 3*a* or 3*b* within the window 13 a substantially transparent touch sensitive array such as a capacitive array that enables a user to input commands using their fingers or a stylus. In this case, the keyboard may be omitted and the display may display soft keys that are activatable by the user using the stylus or a finger. The mobile telephone processor may then be programmed to display different types of soft keys when the fascia is used in the landscape rather than the portrait orientation and, of course, different types of soft keys may be provided on different types of fascias.

In the above-described examples, the user input device and passive data storage device 17 are provided in a fascia for the mobile telephone. This need not necessarily be the case. The mobile telephone may have a conventional fascia or a fascia such as that shown in FIG. 1 but without the passive data storage device and a separate user interface device having a passive data storage device and the functional components shown in FIG. 9 may be provided so that, when the separate user interface device is coupled to the mobile telephone by a mechanical coupling mechanism or is positioned sufficiently close to the mobile telephone that the first and second couplers LC1 and LC2 are inductively coupled, then the controller of the passive data storage device causes control data to be read from the data storage device so as to modulate the oscillating signal to communicate to the mobile telephone instructions to the mobile telephone processor that it is to ignore the in-built user interface and to receive user input instructions from the user input device. This would enable, for example, a user to have a separate lightweight, non-self-powered user interface device having as the user interface device at least one of a keypad, keyboard, touch screen, joystick, finger print device, and digitizing tablet that enables the user, by bringing the separate user interface device into contact with or in proximity to the mobile telephone, to override the normal user interface of the telephone and to use the user interface device to facilitate, for example, playing of games software or, where the user interface device enables a QWERTY type keyboard layout, to facilitate entering of text messages or notes. It may also be possible to provide the display in the fascia.

In the above described examples, data carried by the passive data storage device affects the functionality or capabilities of the mobile telephone. Additionally or alternatively, the reader processor may be programmed so as to automatically cause the mobile telephone processor to switch the mobile telephone from a standby mode to an active mode only when the fascia is correctly fitted to the main body, thereby preventing any accidental operation of the mobile telephone with its fascia removed.

Some examples of mobile telephones, in particular those incorporating PDA like facilities, include a movable, for example hinged, cover or lid. In this case, it will be appreciated that, in order for the passive data storage device to communicate with the reader unit when the cover is in the open, working condition, the passive data storage device should be appropriately located in the cover portion so as to be close to the reader unit when the cover or lid is in the open condition. As another possibility or additionally, a passive data storage device may be located in a part of the cover portion, for example, remote from a hinge, such that the couplers LC1 and LC2 are only coupled when the cover or lid is closed and the mobile telephone processor may be programmed to move from a standby to a full active mode when the reader unit provides a signal indicating that the first and second couplers LC1 and LC2 are no longer coupled. In the above described embodiments, the passive data storage device contains at least a non-volatile memory and may also include processor capabilities. The reader processor 51 may, however, be programmed simply to determine whether or not a detectable component or a particular type of detectable component is coupled to the coupler LC1 and to advise the mobile telephone processor device accordingly. Thus, in those cases where there is no need for data to be communicated from the detectable component to the reader unit 15, the detectable component may simply consist of a coupler that couples to the reader coupler so as to change its characteristics. For example, in the embodiments described above where the couplers couple inductively, then the detectable component may simple consist of the inductive coupler LC2 which, when inductively coupled to the reader coupler LC1, affects its resonant frequency or Q factor. As another possibility, the coupler may consist simply of an inductor that has the same effect when coupled to the coupler LC1. In these cases, different types of fascia may have, for example, different inductance and, as the case may be, capacitance values enabling the reader unit 15 to distinguish different fascias and to communicate this information to the mobile telephone processor so as to affect the functionality of or operating characteristics of the mobile telephone as described above.

Where the detectable component consists simply of the inductive coupler LC2, then the inductance may be provided by Litz wire, increasing the sensitivity of the coupling. As another possibility or additionally, the inductive coupler may include, in series with the inductance, a resistance formed of material exhibiting the GMI (Giant Magneto Impedance) effect, that is a material that has a skin resistance that, when a relatively high frequency oscillating signal is supplied through the material, varies with magnetic field. The resistive component may be formed of, for example, a cobalt, amorphous alloy. As another possibility, the coupling element LC2 may consist simply of a loop of GMI wire or ribbon. As another possibility, a loop of GMI wire or ribbon may be associated with the inductance of the inductive coupler LC2. In this case, a separate capacitor may or may not be provided. Where the inductive coupler includes GMI material, then the oscillator 43 will provide the high frequency oscillating signal and the reader unit will also include a relatively low frequency pulsed oscillator. In this case, coupling of the first and second inductive couplers causes a decrease in the amplitude in the carrier signal flowing through the inductive L1 with its amplitude being modulated in accordance with the change in resistance of the resistive GMI component due to the magnetic field generated by the pulsed low frequency oscillator. Further details of passive detectable components incorporating GMI material are described in the applicants co-pending UK Patent Application number 0129492.5 filed 10 Dec. 2001, the whole contents of which are hereby incorporated by reference.

In the above-described embodiments, the passive data storage device 17 uses amplitude modulation to transmit data to the reader unit 15. It will, however, be appreciated that frequency modulation may be used as may phase modulation as described in WO 97/23060 (PCT/GB96/02975), the whole contents of which are hereby incorporated by reference.

In the above described embodiments, the first and second coupling elements are arranged to couple inductively. The first and second coupling elements may be arranged to couple in any other manner that requires the first and second coupling elements to be in close proximity but not in physical contact with one another. For example, the first and second coupling elements may be arranged to couple capacitively. These non contact arrangements have advantages over ohmic coupling arrangements because the use of ohmic coupling has the disadvantage that actual electrical contact needs to be established between the first and second coupling elements and that this requires the coupling elements to be exposed which may make manufacture of the fascia 3 more difficult and repeated removal and fitting of fascias may cause wear and tear of the coupling elements. Also, both capacitive and ohmic coupling require more accurate alignment and closer positioning of the first and second coupling elements than inductive coupling. Other forms of coupling, such as an optical coupling, may also be used.

Figure 13:
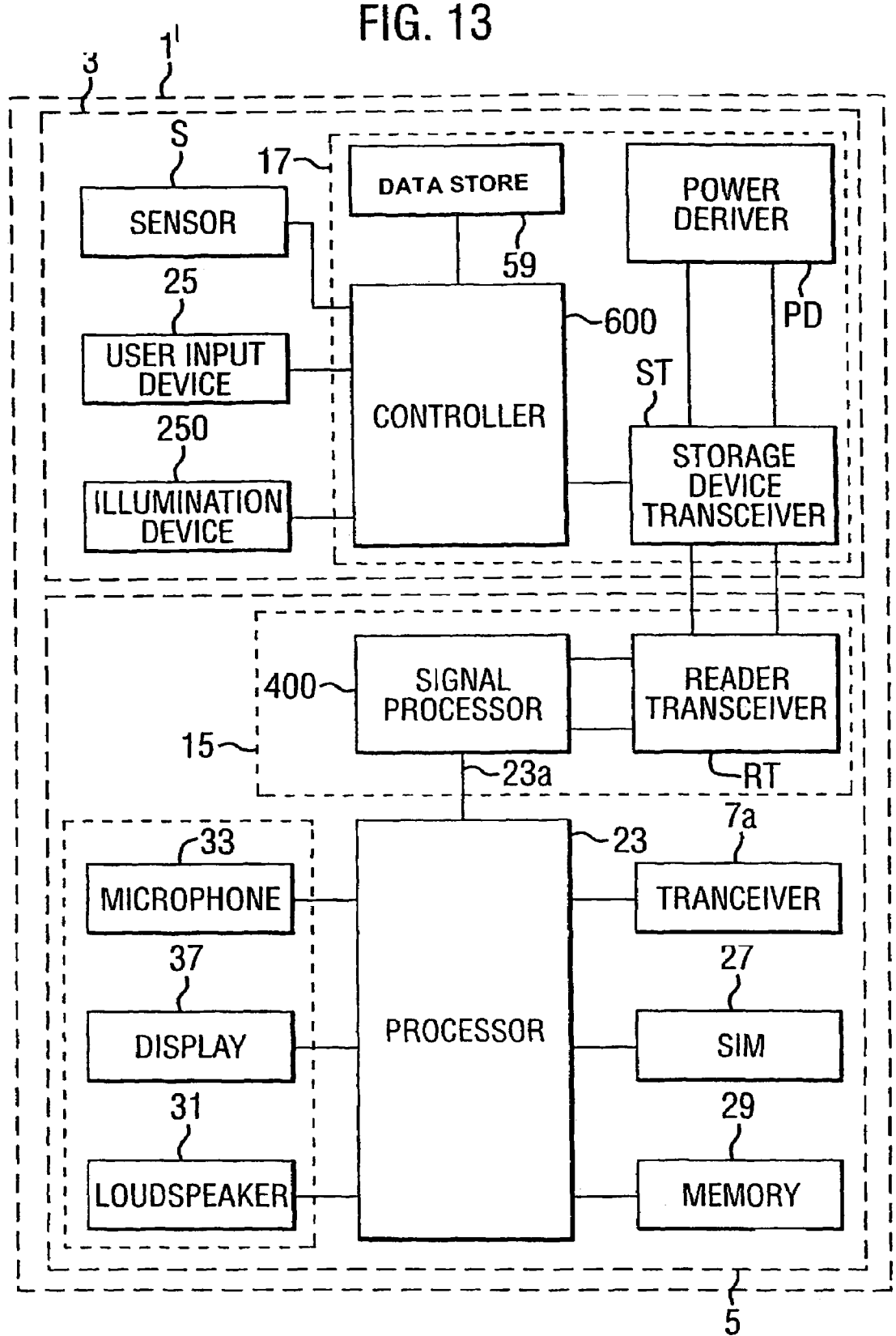
FIGS. 13 to 15 show block diagrams illustrating further examples of portable communication devices embodying the invention.

FIG. 13 shows a functional block diagram of another example of a mobile telephone 1' embodying the invention which differs from the mobile telephone described above with reference to FIGS. 2, 3 and 4 in a number of ways. For simplicity, the connections of the various functional components of the passive data storage device 17 (other than the controller 600) to the power deriver PD are not shown in FIG. 13.

In the mobile telephone 1' shown in FIG. 13 the processor 23 and memory 29 of the mobile telephone also carry out the functions of the reader processor 51 and reader memory 53 shown in FIG. 3 so that these components need not be present in the reader unit 15.

In addition, derivation of power by the passive data storage device 17 and data communication between the passive data storage device 17 and the reader unit 15 is achieved by an electrical wire connection between a reader transceiver RT of the reader unit 15 and a storage device transceiver ST of the passive data storage device. The reader transceiver RT thus replaces the oscillator controller 41, oscillator 43 and coupler LC1 shown in FIG. 3 while the storage device transceiver ST replaces the modulator M and coupler LC2 shown in FIG. 4. The reader transceiver RT and storage device transceiver ST may communicate data by any conventional modulation technique, for example amplitude, frequency, pulse code modulation and so on.

As illustrated in FIG. 13, the fascia 3 also includes an illumination device to provide a backlight for the user input device 25. The illumination device 250 may be, for example, one or more, light emitting diodes (LEDs) and the controller 600 may include an LED matrix driver.

The fascia 3 may also include a sensor S as described above. The sensor S may be, for example, a sound sensor that causes the controller 600 to switch on or flash the LEDs in response to sound so enabling, for example, a visual indication of a ringing tone. As another possibility, the sensor S may be an optical input that enables direct communication with an external keypad or personal digital assistant.

Figure 14:
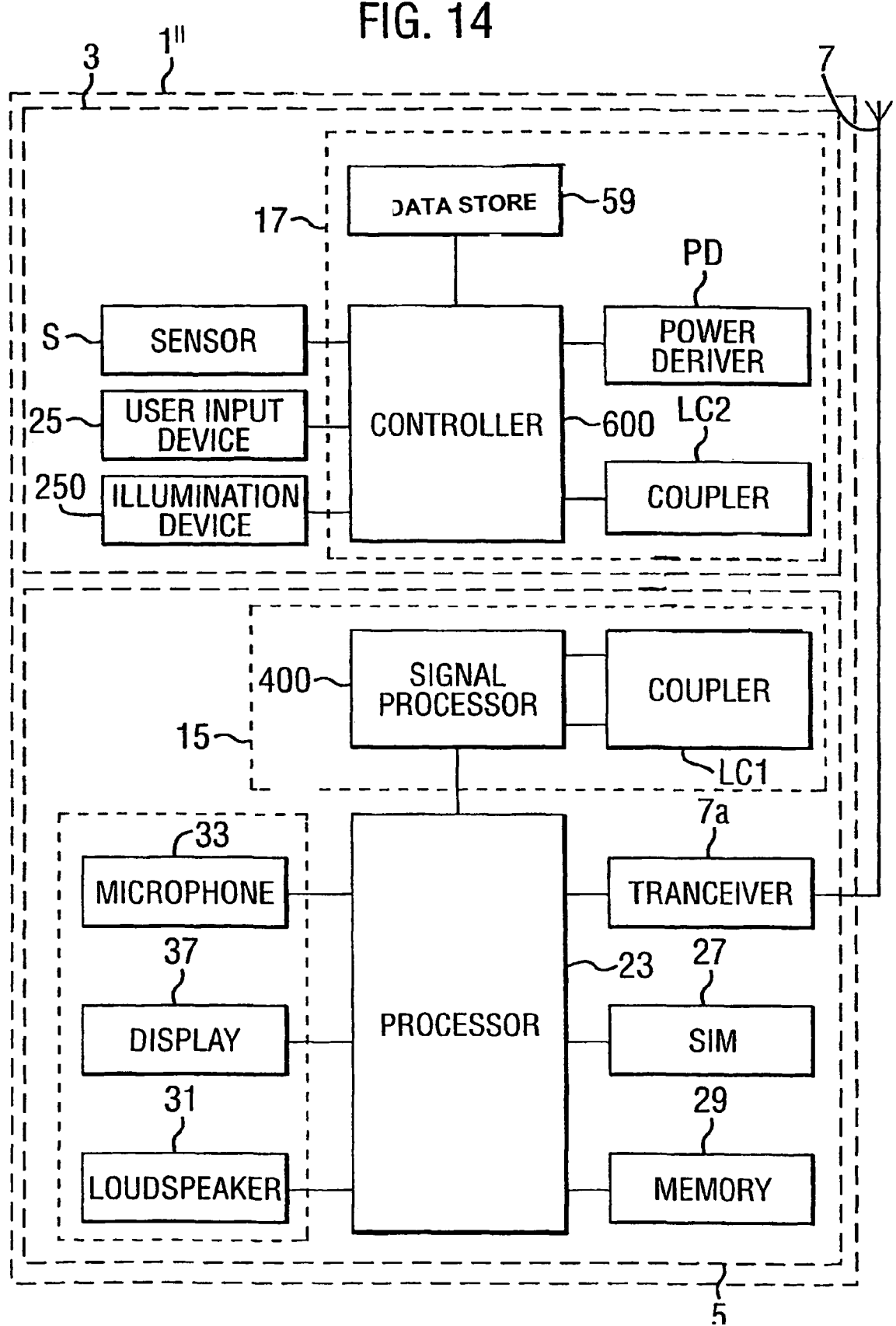

In the embodiments described above with reference to FIGS. 2 to 12, the reader unit 15 includes an oscillator 43 and oscillator controller 41 for generating a high frequency or RF signal from which components carried by the fascia 3 derive a power supply and via which data communication between the passive data storage device 17 and the reader unit 15 occurs. FIG. 14 shows a functional block diagram, similar to FIG. 13 of another example of a mobile telephone 1A embodying the present invention wherein the oscillator and oscillator control are omitted from the reader unit and the couplers LC1 and LC2 are tuned to the RF signal emitted by the antenna 7 of the mobile telephone so that the components carried by the fascia 3 derive a power supply from the RF signal transmitted by the mobile telephone and data communication between the passive data storage device 17 and the reader unit is achieved in the manner described above with reference to FIGS. 6 and 7 by varying the loading of the inductive coupler LC2 to provide an amplitude modulated signal. Frequency or phase modulation may also be used, however amplitude modulation is more desirable as it should not interfere with the mobile telephone GSM signal. In other respects, the mobile telephone 1" shown in FIG. 14 is similar to that shown in FIG. 13.

In operation of the mobile telephone 1" shown in FIG. 14, when the mobile 14 is powered-up by its processor 23, the tuning of the inductive coupler LC2 to the frequency of the RF signal transmitted by the antenna 7 enables the power deriver PD to derive a power supply for the passive data storage 17 from the RF signal transmitted by the mobile telephone.

When powered-up, the passive data storage device 17 transmits data stored in the data store 59 by modulating the RF signal. The positioning of the reader unit 15 on the main body of the mobile telephone and the positioning of the passive data storage device 17 on the facia 3 are such that the coupler LC1 is positioned very close to (within 8 mm of) the coupler LC2 and accordingly will pick up the modulation from the passive data storage device 17. This enables the passive data storage device to communicate its identity code to the processor 23 of the mobile telephone 1" upon powering-up of the mobile telephony RF carrier signal. The coupler LC2 is, in this example, also positioned between the antenna 7 and the coupler LC1 to shadow or hide the coupler LC1 from the RF signal supplied by the antenna so that the signal supplied by the data storage device is not swamped by the antenna signal.

The processor 23 of the mobile telephone may be programmed to expect an identity code from the signal processor 400 of the reader unit 15 upon power-up so that there is no need for any handshaking operation.

The controller 600 of the passive data storage device may be programmed to transmit its identify code a number of times, for example three times, and then to cease modulation of the RF signal transmitted by the mobile telephone 1" until, after the mobile telephone has ceased transmitting, the mobile telephone next commences transmission of its RF signal.

The processor 23 of the mobile telephone may be programmed to send a clean, unmodulated, RF signal for a few milliseconds before commencing frequency modulation in accordance with the GSM standard so that the RF signal that the passive data storage device modulates is clean, that is unmodulated. This should, however, not be necessary where the passive data storage device uses amplitude modulation to convey its data to the reader unit 15.

Figure 15:
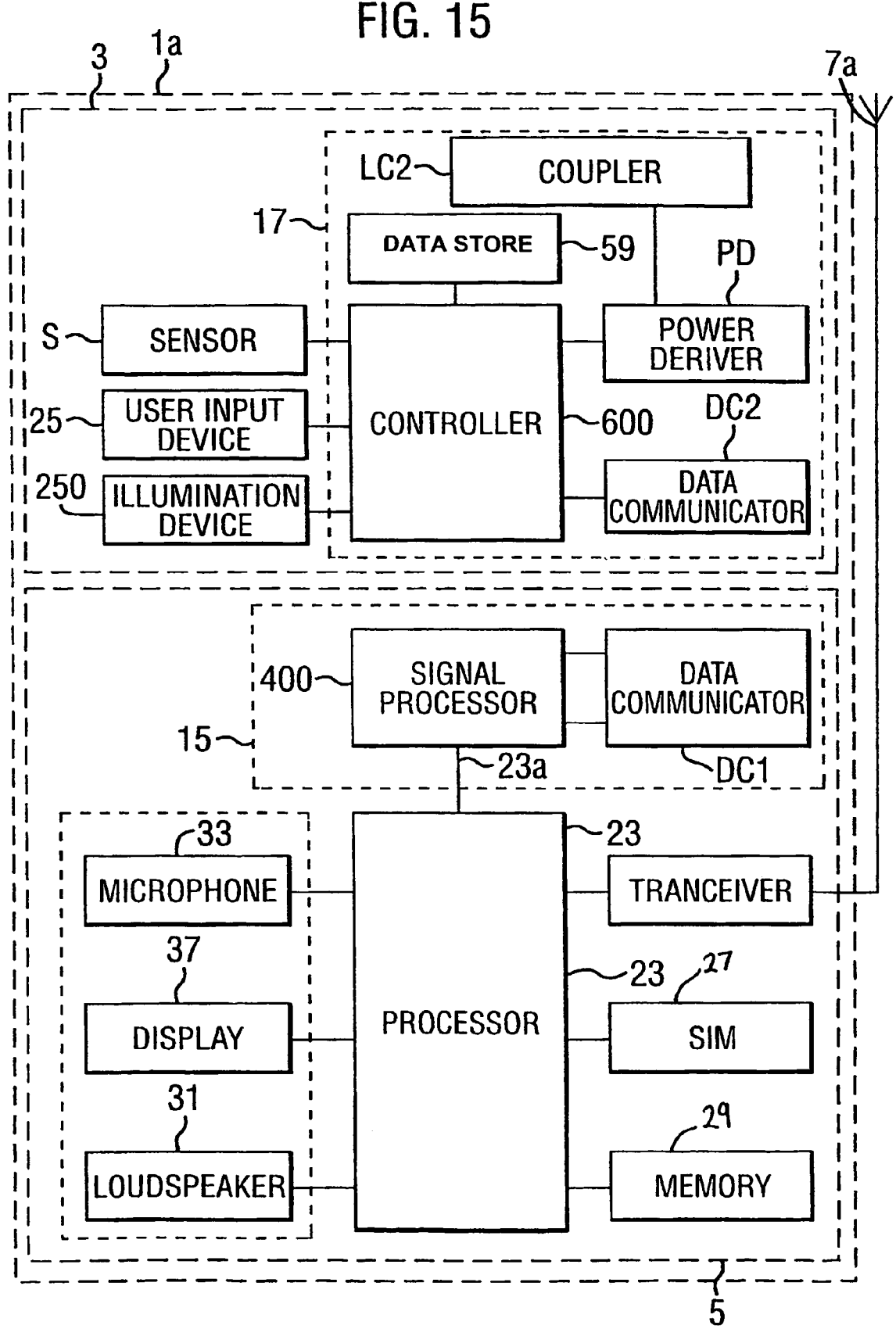

In the above-described embodiments, data is communicated between the passive data storage device 17 and the reader unit by modulating the signal from which the passive data storage device 17 derives its power. This need not necessarily be the case and a separate data communication channel between the passive data storage device and the reader unit 15 may be used. FIG. 15 shows a functional block diagram similar to FIG. 14 of another example of a mobile telephone 1*a* embodying the present invention where, as in FIG. 14, the passive data storage device 17 derives its power supply from the RF signal transmitted by the antenna 7*a* of the mobile telephone. However, in this case, communication of data between the passive data storage device 17 and the reader unit 15 is effected by data communicators DC1 and DC2.

In one example, the data communicators DC1 and DC2 may simply establish an electrically conductive path between the controller 600 when the fascia 3 is coupled to the main body of the mobile telephone so that data is supplied directly from the controller 600 to the signal processor 400.

As another possibility, the data communicators DC1 and DC2 may communicate optically with the data communication DC2 having a light emitting device which is caused to flash on and off by the controller 600 to transmit data stored in the data store 59 and the communicator DC1 having a light receiving device such as a photodiode or phototransistor for receiving light emitted by the light emitting device of the data communicator DC2. Where data can be written into the data store 59, then the data communicators DC1 and DC2 may each have optical transceivers so that data can also be communicated optically from a light-emitting device of the data communicator DC1 to a light receiving device of the data communicator DC2.

As another possibility, the data communicators DC1 and DC2 may be configured to communicate acoustically. For example, the data communicator DC1 may be a microphone and the data communicator DC2 a loudspeaker with, in this case, data being communicated from the passive data storage device to the data communicator DC1 as acoustic signals, preferably short pulses. In this case, it may be possible to use the microphone 33 of the mobile telephone as the data communicator DC1. As another possibility, acoustic coupling between the data couplers DC1 and DC2 may be achieved by the use of piezoelectric transducers. Other forms of data communication between the data communicators DC1 and DC2 may be used such as, for example, mechanical vibration, electrostatic and electromagnetic signals.

As in the embodiment described with reference to FIG. 14, when the mobile telephone 1*a* starts to transmit its RF signal, the passive data storage device 17 is powered and the controller 600 then causes data from the data store 59 to be communicated by the data communicator DC2 to the data communicator DC1 of the reader unit.

In each of the embodiments shown in FIGS. 13 to 15, the passive data storage device remains powered while the mobile telephone is powered and a keyboard scanner included within the controller 600 receives data from the user input keypad or keyboard and communicates this to the reader unit 15. The embodiments shown in FIGS. 13 to 15 may, however, be modified so that the user input device (and any associated illumination device) form part of the main body of the mobile telephone as in the embodiment described with reference to FIGS. 2 to 4. Incorporating the keypad or keyboard into the facia 3 has, however, significant advantages as discussed above with reference to FIGS. 8 to 12.

The passive data storage device may comprise an application specific integrated circuit (ASIC) with the data store 59 comprising, for example, an electrically erasable memory, enabling the keyboard scanner software to be configured at factory level to co-operate with the particular type of keypad or keyboard carried by the particular cover into which the passive data storage device is to be incorporated.

The embodiments described with reference to FIGS. 2 to 12 may be modified so that the mobile phone processor 23 carries out the functions of the reader processor 51 so that, the reader unit 15 need not include the reader processor 51 and reader memory. Conversely the embodiments of FIGS. 13 to 15 may have reader units incorporating the reader processor and memory.

The embodiments described above with reference to FIGS. 2 to 12 may be modified to use the power derivation and data communication schemes described above with reference to FIGS. 13, 14 or 15. For example, the data communicators DC1 and DC2 may be used where the passive data storage device is powered via the reader unit rather than the mobile telephone antenna As another possibility coupling between the passive data storage device 17 and the reader unit 15 may be via a coupling arrangement such as described in the applicants co-pending published International Application No. WO00/31676 may be used and the whole contents of that document are hereby incorporated by reference.

Figure 16:
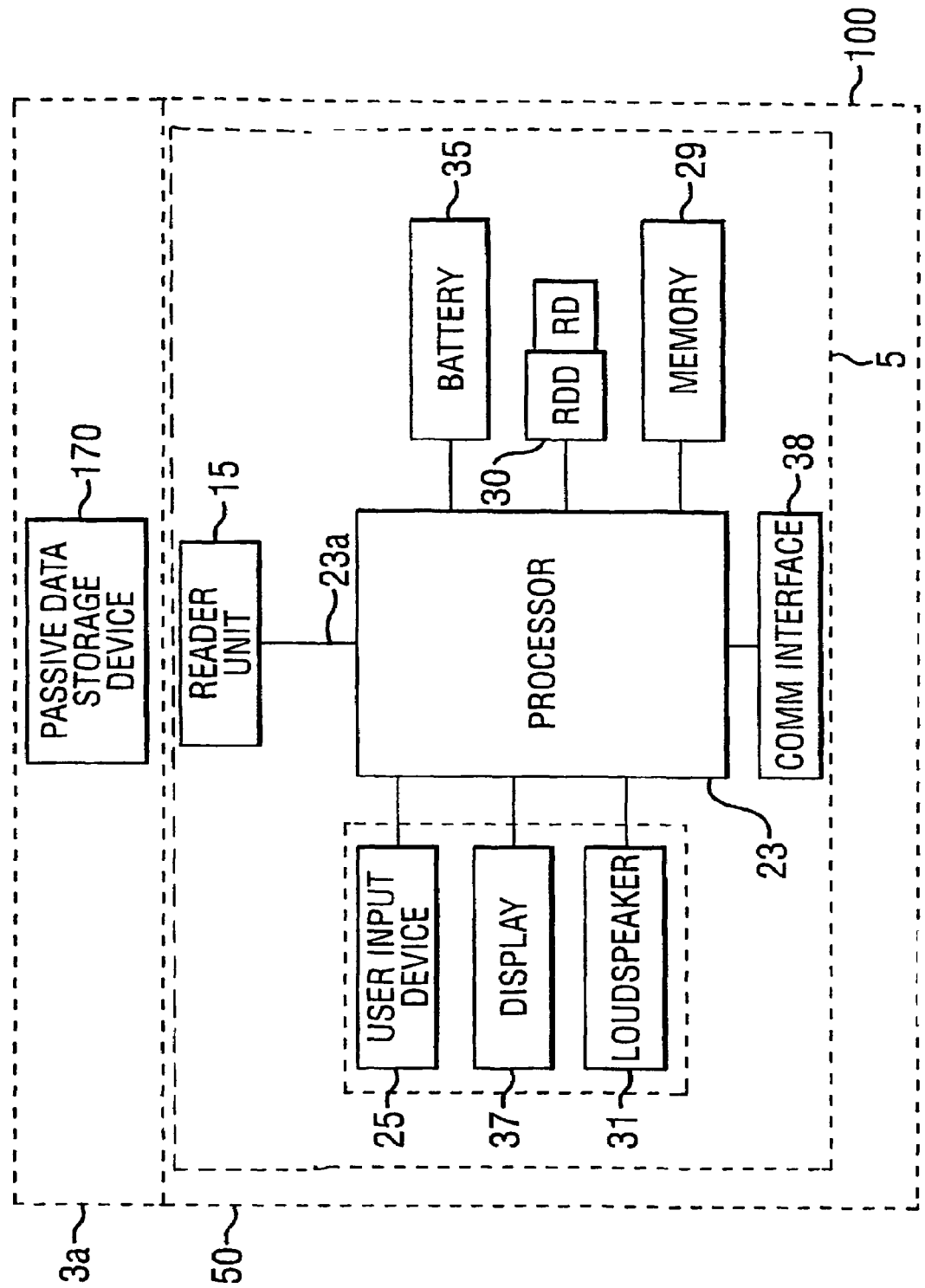
FIG. 16 shows a functional block diagram of computing apparatus such as a personal digital assistant.

The present invention may be applied to computing devices such as personal computers, PDA (personal digital assistant) or games console with or without facilities for enabling communication over a mobile telecommunications network. FIG. 16 shows a functional block diagram of a computing device such as a PDA (personal digital assistant) or games console 100 which differs from the mobile telephone shown in FIG. 2 in that the SIM card is replaced by a removable disk drive 30 for receiving a removable disk RD, and the transceiver is replaced by a communications interface 38 which may be a MODEM. In this case, the control data may comprise software data in the form of new software and/or upgrades for existing software provided on the PDA including, for example, games software, wordprocessing, spread sheet and other applications software. The control data may alternatively or additionally include information data such as, for example, tunes and images that may be played via the loudspeaker 31 or shown on the display 37 under control of the processor 23. As described above, the control data may alternatively be in the form of access data that enables the reader unit 15 to instruct the processor 23 where to obtain data represented by the access data by, for example, accessing a particular site on the Internet or another network using the communications interface. Such data may be pre-stored in the memory 29, or available via the communications interface 38. The reader unit and data storage device of this computing apparatus may have any of the configurations described above where the mobile telecommunications transceiver can be replaced by the communications interface, that is any of the configurations that do not require the data storage device to derive a power supply from the mobile telecommunications transceiver signal.

Embodiments will now be described of electronic devices or electrical appliances having an attachable functional component such as, for example, a replaceable tool will be described.

Figure 17:
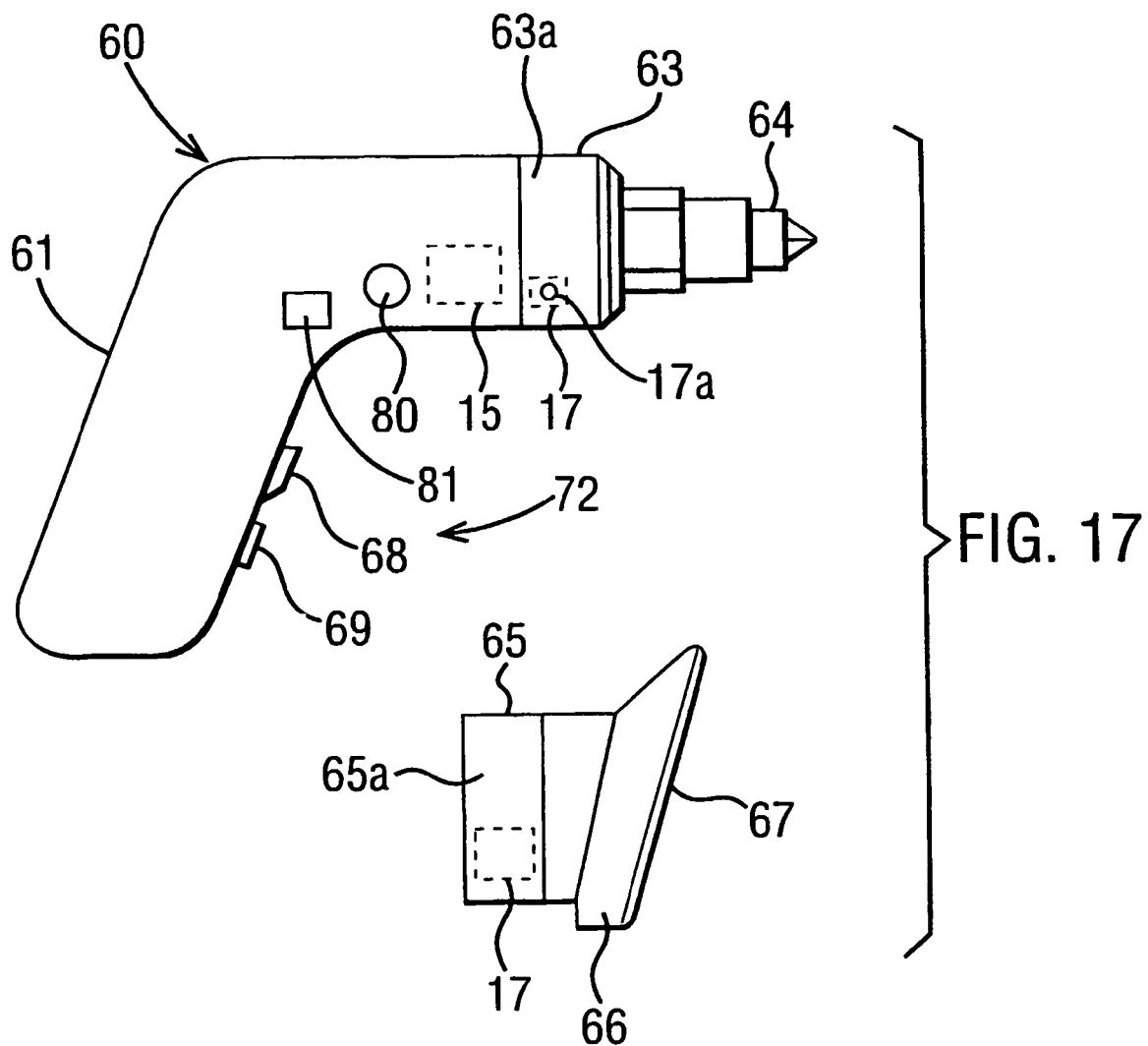
FIG. 17 shows a very diagrammatic representation of an electronic device in the form of a power tool having a number of replaceable heads, two of which are shown, one attached to the power tool.
Figure 18:
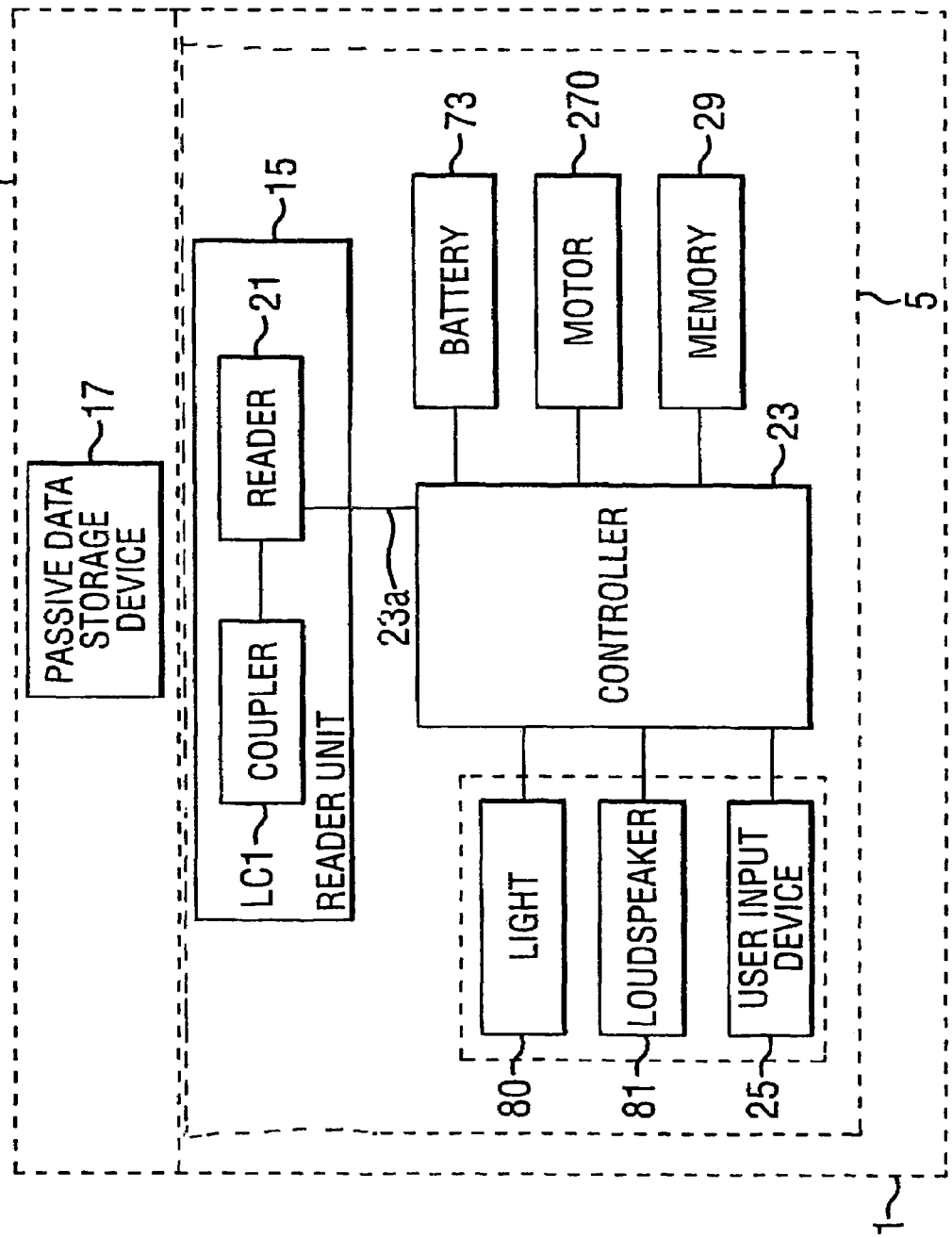
FIG. 18 shows a functional block diagram of functional components of an electrical appliance embodying the invention, including a reader unit for enabling detection of a replacement fascia.

FIG. 17 shows a diagrammatic perspective view of a domestic power tool 60 while FIG. 18 shows a functional block diagram of the electrical appliance 60. The electrical appliance may be mains or battery powered, having a number of different attachable components comprising or arranged to carry tools for performing different tasks. As shown in FIG. 17, the power tool main body 61 is carrying a replaceable component in the form of a chuck assembly 63 having a chuck 64 for receiving, for example, drill bits or screwdriver heads. FIG. 17 also shows a further attachable component that may be fitted to the main body 61 of the power tool in place of the chuck assembly. In the example shown, the further attachable component 65 is a sander assembly having a sander foot 66 for receiving a sanding sheet 67.

In the case of this power tool, the main body 61 has an outer plastics, generally moulded, casing. Coupling between the main body 61 and an attachable component 63 or 65 is effected via the drive shaft of a motor (not shown in FIG. 17) of the power tool. When an attachable component 63 or 65 is fitted to the main body, a plastics coupling collar 63a or 65a of the replaceable component is fitted onto a portion of the casing of the main body 61. A passive data storage device 17 is fitted to, generally embedded within, the coupling collar 63a or 65a while a reader unit 15 is housed within the casing of the main body together with the other control circuitry of the power tool.

The reader unit 15 is positioned such that, when the attachable component 63 or 65 is fitted to the main body 61, the passive data storage device 17 will be in range of, as shown will lie adjacent to, the reader unit 15 so that, as will be described in detail below, couplers of the passive data storage device 17 and reader unit 15 couple to enable the passive data storage device 17 to derive a power supply from a signal supplied by the reader unit 15 and, when so activated, to transmit control data contained in its memory.

As can be seen from FIGS. 17 and 18, the main body 61 comprises, in addition to the reader unit 15, a controller such as a microprocessor or microcontroller 23 which controls the overall operation of the power tool 60. The controller 23 may be associated with a non-volatile memory 29 which has a read-only portion which contains control operation software data and information data and a writable portion. The controller 23 is coupled to a motor 270 for driving the attachable tool in known manner and also to a user interface 25 consisting of a user input device 72 which will generally, as is known in the art and as shown in FIG. 17, consist of an on/off switch 68 and possibly also a speed control 69. The user interface may also include one or more indicator lights 80 and a rudimentary loudspeaker 81 that, under control of the controller 23, may issue audible warnings to the user under certain circumstances. In this example, the power tool 60 is battery operated and the control circuitry 50 in the main body also includes a battery 73. In the interest of simplicity, the couplings between the battery 73 and the various components of the control circuitry, apart from the controller 23, are not shown in FIG. 18.

As in the earlier described embodiments, the reader unit 15 comprises a reader 21 which is coupled to the controller 23 via line 23a and to a first coupler or coupling element LC1. The first coupling element LC1 is arranged to couple to a similar second coupling element LC2 (see FIG. 4) carried by the passive data storage device 17 when the attachable tool 63 or 65 is fitted to the main body of the appliance. In this embodiment, the reader unit 15 and the passive data storage device 17 are as described above with reference to FIGS. 3 to 6.

When the attachable component is fitted to the main body of the electrical appliance the coupling element LC1 of the passive data storage device 17 lies adjacent and in close proximity to the coupling element LC2 of the reader unit 15, inductively coupling the passive data storage device 17 to the reader unit 15 and data is output by the passive data storage device 17 and read by the reader unit as described above with reference to FIGS. 3 to 6.

The control data output from the data store 59 is extracted from the modulated oscillating signal by the demodulator 45, modulation level detector 47, threshold detector 49 and reader microprocessor 51 to provide a data input signal to the controller 23 representing the data output from the data store 59.

The control data output from the data store 59 and downloaded by the reader microprocessor 51 to the controller 23 may then be stored in the writable portion of the memory 29. This control data may comprise at least one of software data, that is computer code executable or implementable by the controller 23, and information data that is stored in the memory 29 so as to be usable by the controller 23. As an example of software data, the data downloaded from the passive data storage device may include upgrades or modifications of any electrical appliance software where the attachable component is supplied by or under licence from the manufacturer or supplier of the electrical appliance.

The control data may be, for example, an identity code that enables the controller 23 to identify the particular type of attachable tool by comparison with data stored in its memory. The controller 23 may then control the functionality and capability available to the user in accordance with the attachable tool.

As an example, the controller 23 may control at least one of the speed, drive direction and duration of the operation of the motor 270 in accordance with the control data received by the reader microprocessor. Alternatively or additionally, the controller 23 may inhibit operation of the electrical appliance if the reader microprocessor receives no control data or receives incorrect or non-understandable control data, for example if the reader microprocessor receives the wrong access or identity code data. This would ensure that, for safety reasons, the electrical appliance is not accidentally operated with an inappropriate tool fitted and for both safety and power saving purposes would ensure that the electrical appliance is not accidentally operated when no tool is attached. Where an incorrect tool is fitted, then the reader microprocessor may cause the controller 23 to cause the warning light 80 to flash or the loudspeaker 81 to emit an audio signal such as an audible warning beep.

Where, as described above, the data store 59 is writable, then the passive storage device may also be used to provide a record of historical degree and frequency of use of the attachable tool. Further details of the writing and reading operations that may be carried out by the control engine 330 are to be found in UK Patent Application number: 0031518.4 and the corresponding POT application Number GB01/05690, the whole contents of which are hereby incorporated by reference.

The passive data storage devices carried by the attachable component or accessory may, again, simply carry data that enables the reader microprocessor 51 (FIG. 3) of the reader unit 15 to determine whether an attachable component or a correct attachable component is fitted and to inhibit operation of the attachable component and/or alert the user by activating the warning light 80 or loudspeaker if an incorrect attachable component is detected (that is if incorrect control data is received) or to inhibit operation completely if no control data is received so inhibiting operation of the electrical appliance without an attachable component attached and thus reducing the likelihood of the electrical appliance being activated accidentally when being carried or transported. Alternatively or additionally, the control data carried by the passive data storage device may identify different types of attachable components (for example, different attachable components for use by adults and children respectively) and may control the motor drive speed and/or the duration for which the motor operates following actuation of the electrical appliance by the user using the on/off switch 72. It is also possible to provide, in a manner analogous to that for relatively cheap childrens toys, such electrical appliances with sound generation systems that play a tune (via the loudspeaker 81) for example to encourage a child to use the electrical appliance. In this case, the passive data storage device 7 may carry different sound files that may be used by this sound generation system. Where the memory of the passive data storage device is writable then the controller 23 may cause data regarding the frequency and duration of use of an attachable component to be stored in the passive data storage device for subsequent access, for example, using a reader unit similar to that described above but having a reader microprocessor programmed to supply extracted data to a personal computer, for example, via an appropriate conventional communication arrangement (RS232 interface, infrared link and so on).

In the above-described embodiments, the attachable component has been an attachable tool. The attachable component may, as another possibility, comprise a housing or cover portion of the electrical appliance or electronic device that may be changed for aesthetic reasons. For example, the main body may have a clip-on housing portion that can be swapped for another housing portion that may be functionally and/or visually different. Thus, for example, decoratively different clip-on housing portions may be provided for children so as to make an electrical appliance attractive to use. In this case, the passive data storage device 17 may be located within the housing or cover portion. Also, where an electrical appliance has a modular control panel, for example in the case of a food processor, then the fascia of that control panel may be changeable for functional, aesthetic or decorative reasons. Again, in this case, the passive data storage device 17 may be accommodated in the changeable fascia.

The present invention may also be applied to other forms of electronic devices such as, for example, televisions, video recorders, DVD players, stereos, personal computers, laptops, games consoles, telephones and the like. In these cases, part of the housing of the electronic device may be replaceable, for example the fascia of a television may be replaceable or a user input control panel fascia may be replaceable. In these cases, the passive data storage device will be carried by the replaceable fascia or control panel and different fascias or control panel fronts may carry different control data.

In one aspect, an electronic device has a main body and an attachable component. The electronic device has a user interface for enabling a user to operate the electronic device and a controller for controlling operation of the electronic device in response to operation by a user of the user interface. The attachable component has a passive data storage device having a memory storing control data for controlling an operation or affecting a function of the electronic device. The attachable component is operable to derive a power supply from a signal supplied by main body when the attachable component is coupled to the main body and to supply control data from the memory to the controller when the attachable component is attached to the main body. The controller being operable to control an operation of or affect a function of the electronic device in accordance with control data received from the data storage device. The attachable component may be a tool that is operated by the electronic device.

The present invention may be applied to mobile communications devices and other electrical appliances and electronic devices having a microprocessor or microcontroller where a portion or the whole of the housing or a cover of the device is replaceable or where an attachable component such as a tool or a plug-in key or component can be attached to or fitted into or onto the device.

As examples, the present invention may be applied to watches (where, for example, the bezel may be replaceable), electronic games, puzzles, toys, vehicle body panels or parts such automotive, aircraft, shipping and other vehicle component parts, and so on provided that the communication between the passive data storage device and the reader unit can be shielded from interference by the vehicle engine, domestic equipment such as electric kitchen knives having attachable knives components, food processors having replaceable blades and mixing implements, smart packaging where the passive data storage device includes data regarding the product, for example cooking times in the case of a food product, for example microwave cooking times, smart cups or coffee maker receptacles that include data indicating how you like your coffee, water filters with attachable filters and/or jugs, beverage makers with attachable jugs or receptacles, vacuum cleaners having attachable tools and/or dust bags, filters and so on, polishers having different attachable components; personal care items such as electrical shavers or razors where the attachable component is a razor or shaver head, dental hygiene devices, for example electrical toothbrushes where different attachable heads may relate to different cleaning profiles, hair dryers having attachable brushes, diffusers and so on, hair tongs having different attachable tools and other personal care items, where the passive data storage device can be embedded in, for example, a plastics portion of the attachable component, home/office electrical devices such cameras where the attachable component is a lens carrying data identifying an exposure time, medical electrical devices having different attachable tools, blades and so on, tips for pipettes to calibrate the pipette, a fascia or other cover portion in the case of, for example electrical devices such as televisions, video recorders, DVD players, stereos, remote controls for any of these, answering machines, personal computers, laptops, games consoles, telephones, telephone accessories, vending machines, polishers, answering machines, watch bezels and the like where the attachable components may be different clip-on covers and the control data gives different technology features. The attachable component could also be a battery.

A passive data storage device may be incorporated into a component or accessory of an electrical device such as those described above as a safety feature. For example a reader unit may be incorporated into one of a body of an electrical kettle or food processor and the data storage device incorporated into the other of the body and the lid (generally the data storage device will be in the lid) and the control device configured so as to prevent activation of the electrical device unless the presence of the data storage device is detected thus providing a safety interlock to prevent operation of the electrical device without its lid being present or being fully shut. Such a safety device or "deadman's handle" may also be provided for other types of electrical devices or appliances including machinery. For example, power tools, especially power tools such as chainsaws, may incorporate a reader unit that prevents operation of the appliance unless the appliance is correctly grasped by the user wearing a glove incorporating a data storage device readable by the reader unit. This will prevent accidental operation of a hand holdable electrical appliance such as a power tool unless the user is wearing the correct gloves and is gripping the appliance correctly.

Figure 19:
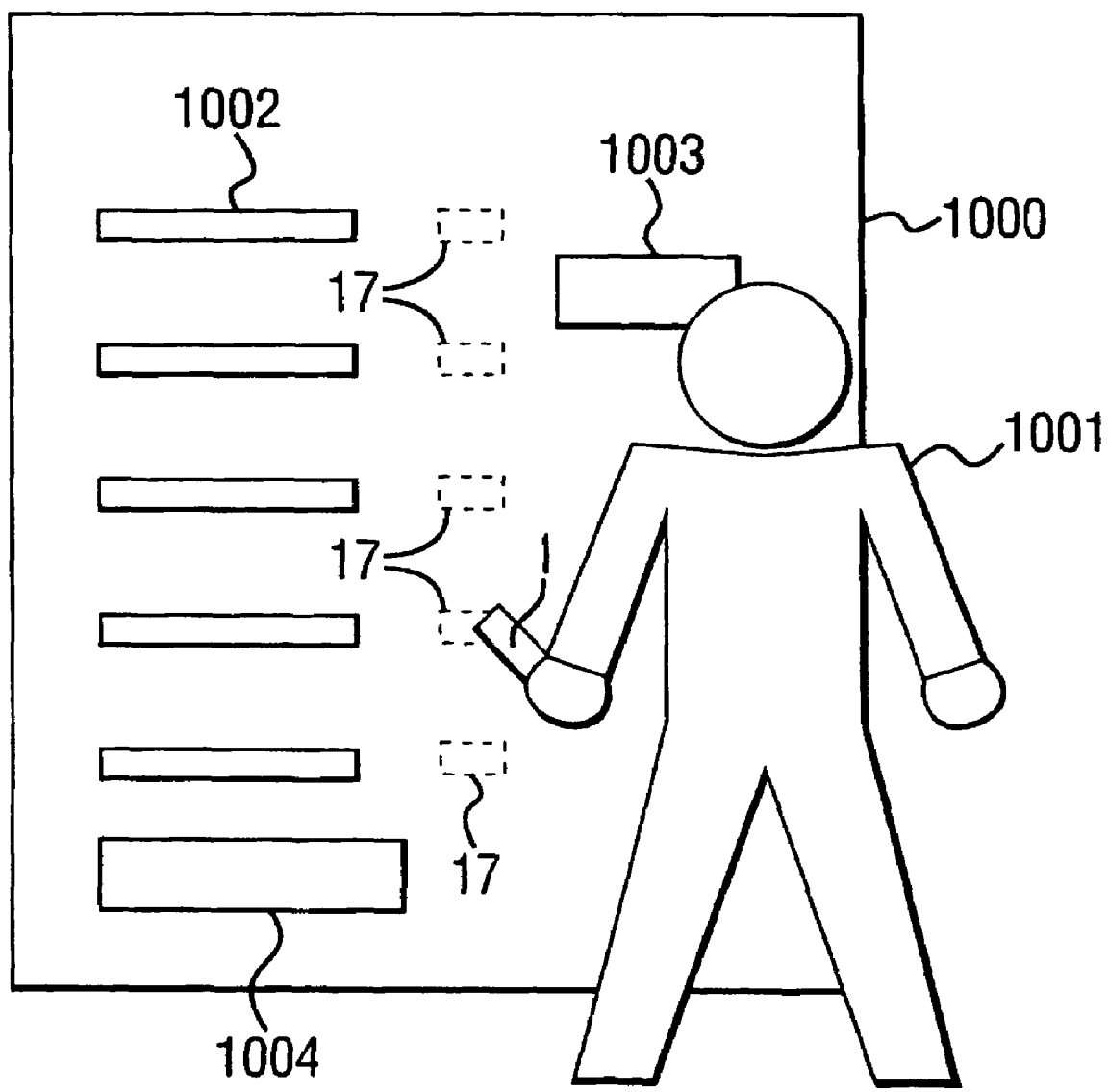
FIG. 19 shows an example of a vending system.

The present invention may be applied where the component is not necessarily attachable to the device but is an accessory that can be brought into close proximity, typically a few inches, say about or less than 10 cm, to the device. For example the accessory may be a toy, a promotional item, promotional literature, an advertising hoarding or similar advertising material, a ticket, identity card, phone card, debit card or other mobile commerce product, packaging such as a product box or wrapping, vending machine or access device carrying a data storage device that contains data that affects an electrical device (be it a mobile communications device or other electrical or electronic device such as a toy, computer, games console, telephone and so on) carrying a reader unit. As examples, a washing powder (or dishwasher powder) box may carry a data storage device that can be read by a reader incorporated in the washing machine (or dishwasher) to enable the washing cycle to be controlled in accordance with the type of powder being used, an identification device may carry a voice print ID to be detected by a reader unit, tyre valves may contain data that instructs a pump how much to inflate a tyre, a patient needs device may carry a data storage device that provides data to a drug dispenser, for example.

Where the electronic device has communications facilities, then the data read by the reader unit to communicate with another device, for example to enable payment for a service or product to be effected. Thus, as one example and as shown very schematically in FIG. 19, a unit in the form of a product or ticket vending machine 1000 may carry one or more passive data storage devices 17 each protected by an outer skin or coating of the vending machine housing that enables transmission of a radio frequency signal and so shown in dashed lines in FIG. 19. Each passive data storage device 17 is associated with a corresponding box 1002 containing a brief description of the corresponding ticket or product. As shown the passive data storage devices are to the side of the boxes. They may however be within the boxes.

When a user 1001 wishes to purchase a product or ticket from the vending machine he brings his portable communications device 1 into close proximity with the data storage device 17 associated with the desired product or ticket to enable the data storage device to derive a power supply and transmit data to the reader unit in the portable communications device. The reader unit in the portable communications device supplies the read data to the mobile telephone processor which accesses a location on the communications network identified by the data, for example a service provider which may then debit the user's account and return an authorisation code that when entered by the user using a key pad 1003 causes the vending machine to supply the corresponding required product or ticket to an outlet 1004.

Instead of being a vending machine, the unit 1000 may be an advertising hoarding or the like with the passive data storage devices embedded in a cardboard or paper poster. In this case, the keypad and outlet will of course not be present and the user will be coupled by the mobile telephone transceiver to source of information for example a WAP or website corresponding to a selected passive data storage device. In this case, the passive data storage device may be associated with images of different products or services, for example.

Mobile communication devices having reader units as described above may also communicate with one another. Communication by RF or similar electromagnetic frequency has advantages over more sophisticated technology such as BlueTooth™ technology in that the RF communication system is cheaper and is shorter range so that there is less possibility of interference or crosstalk with other devices. Typically a reader unit will be able to communicate with a data storage device or other reader unit over a range of up to about six inches. Also, in contrast to BlueTooth™ which uses a frequency of about 2.4 GigaHertz, uses frequency hopping and a large number, typically 82, channels, RF communication uses a fixed single frequency, typically 13.56 MegaHertz, which provides a continuous signal which is modulated, for example amplitude modulated, by the data to be transmitted. In addition, unlike BlueTooth™, such communications do not require the use of an external protocol. All that is required is that the reader unit can demodulate the modulated carrier signal supplied by the data storage device.

Such a mobile communications device incorporating a reader unit may be used in many forms of commerce, as a payment method, to obtain account details and so on.

The variations described above for the case where the electrical device is a portable communications device may also be applied to any of the other above-described electrical devices or appliances except those that explicitly require a mobile telecommunications transceiver.

The invention claimed is:

1. A portable communications device comprising a main body having a removable housing portion;
   the main body having:
   a transceiver operable to enable transmission and reception of communications over a mobile telecommunications network;
   a first controller operable to control operation of the device; and
   a radio frequency signal supplier operable to supply a radio frequency carrier signal; and a first inductive coupler operable to couple the radio frequency carrier signal inductively to a second inductive coupler of the removable housing portion when the removable housing portion is connected to the main body, the removable housing portion having:
a memory;
a power supply deriver operable to derive a power supply from the radio frequency signal supplied by the portable communications device when the first and second inductive couplers are inductively coupled;
a second controller operable to read data from the memory in response to derivation of a power supply by the power supply deriver;
a radio frequency signal modulator operable to modulate a radio frequency carrier signal supplied by the radio frequency signal supplier of the main body and inductively coupled to the second inductive coupler in accordance with the data read from the memory; and the main body having:
a detector operable to detect the effect of the radio frequency signal modulator on the radio frequency carrier signal to affect the operation of the portable communications device.

2. A system comprising a portable communications device and a data storage device;

the data storage device having: a power supply deriver operable to derive a power supply from a radio frequency signal supplied by the portable communications device, a controller operable to read data from a memory in response to derivation of a power supply by the power supply deriver, and a modulator operable to modulate the radio frequency signal in accordance with the data stored by the memory; and the portable communications device comprising:
a transceiver operable to enable transmission and reception of communications over a mobile telecommunications network;
a device controller operable to control operation of the device;
a radio frequency signal supplier that, when a first inductive coupler of the portable communications device is inductively coupled to a second inductive coupler of any article carrying said data storage device, causes the data storage device to derive a power supply from the radio frequency signal supplied by the portable communications device and to modulate the radio frequency signal in accordance with data read from the memory; and
a data extractor operable to extract the data from the modulated radio frequency signal to affect the operation of the portable communications device.

3. A system comprising a portable communications device and a data storage device;

the data storage device having a power supply deriver operable to derive a power supply from a radio frequency signal supplied by the portable communications device, a controller operable to read data from a memory in response to derivation of a power supply by the power supply deriver, and a modulator operable to modulate the radio frequency signal in accordance with the data stored by the memory; and the portable communications device comprising:

a transceiver configured to enable transmission and reception of communications over a mobile telecommunications network;
a device controller operable to control operation of the device;
a reader having a radio frequency signal supplier and a first inductive coupler operable to couple inductively to a second inductive coupler of said data storage device, when the portable communications device is in close proximity to an article carrying the data storage device, to cause the data storage device to derive a power supply from a radio frequency signal supplied by the radio frequency signal supplier and to modulate the radio frequency signal supplied by the radio frequency signal supplier in accordance with data read from the memory; and
a data extractor operable to extract the data from the modulated radio frequency signal to affect an operation or service of the portable communications device.

4. A system according to claim 3, wherein the device controller is arranged to cause transmission of a communication over the mobile telecommunications network to a location on the network determined in accordance with the data received from the data storage device.

5. A system according to claim 3, wherein the radio frequency signal supplier comprises the transceiver.

6. A system according to claim 3, wherein the radio frequency signal supplier is independent of the transceiver.

7. A system according to claim 3, wherein the reader is provided in a reader unit on part of the portable communications device.

8. A system according to claim 3, wherein the portable communications device has a removable and/or exchangeable portion.

9. A system according to claim 8, wherein the portion comprises a fascia of the device.

10. A system according to claim 3, wherein the portable communications device further comprises a second data storage device having a memory storing data, wherein the portable communications device is operable to communicate data from the memory to the article.

11. A system according to claim 7, wherein the portable communications device further comprises a second data storage device having a memory storing data, wherein the portable communications device is operable to communicate data from the memory to the article, and wherein the second data storage device forms part of the reader.

12. A system according to claim 10, wherein the memory is a read-writable memory.

13. A system according to claim 3, wherein the portable communications device is arranged to communicate with an article having a read-writable memory and comprises a signal supplier operable to modulate the radio frequency signal in accordance with data to be written to the memory.

14. A system according to claim 3 wherein the portable communications device is in the form of a mobile telephone or cell phone or PDA.

15. A system comprising a portable communications device and a data storage device;

the data storage device having a data storage device inductive coupler, a power supply deriver operable to derive a power supply from a radio frequency signal supplied by the portable communications device, a controller operable to read data from a memory in response to derivation of a power supply by the power supply deriver, and a modulator operable to modulate the radio frequency signal in accordance with the data stored by the data storage device; and the portable communications device comprising:
- a telecommunications radio frequency transceiver operable to enable transmission and reception of communications over a mobile telecommunications network;
- a controller operable to control operation of the portable communications device; and
- a reader having:
  - a reader inductive coupler operable, when the portable communications device is in close proximity to an article carrying said data storage device, to inductively couple a radio frequency signal provided by a radio frequency signal supplier of the portable communications device to the data storage device inductive coupler, to cause the data storage device to derive a power supply from the radio frequency signal and to modulate the radio frequency signal in accordance with data read from the memory of the data storage device in response to derivation of a power supply by the power supply deriver and
  - a data extractor operable to extract the data from the modulated radio frequency signal to affect an operation or service of the portable communications device.

16. A system comprising a cellular telephone device and a data storage device;

the data storage device having a data storage device inductive coupler, a power supply deriver operable to derive a power supply from a radio frequency signal supplied by the portable communications device, a controller operable to read data from a memory in response to derivation of a power supply by the power supply deriver, and a modulator operable to modulate the radio frequency signal in accordance with the data stored by the data storage device; and the cellular telephone device comprising:
- a telecommunications radio frequency transceiver operable to enable transmission and reception of communications over a cellular telecommunications network;
- a display operable to display data to a user;
- a keypad to enable a user to input data to the cellular telephone;
- a microphone operable to receive spoken user input;
- a loudspeaker;
- a controller operable to control operation of the cellular telephone device; and
- a reader having:
  - a reader inductive coupler operable, when the portable communications device is in close proximity to an article carrying said data storage device, to inductively couple a radio frequency signal provided by a radio frequency signal supplier of the portable communications device to the data storage device inductive coupler, to cause the data storage device to derive a power supply from the radio frequency signal and to modulate the radio frequency signal in accordance with data read from the memory of the data storage device in response to derivation of a power supply by the power supply deriver and
  - a data extractor operable to extract the data from the modulated radio frequency signal to affect an operation or service of the cellular telephone device.

* * * * *